(12) United States Patent
Rastogi et al.

(10) Patent No.: US 11,171,849 B2
(45) Date of Patent: Nov. 9, 2021

(54) COLLECTING SAMPLES HIERARCHICALLY IN A DATACENTER

(71) Applicant: VMware, Inc., Palo Alto, CA (US)

(72) Inventors: Gaurav Rastogi, San Francisco, CA (US); Ashutosh Gupta, San Jose, CA (US)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 16/669,227

(22) Filed: Oct. 30, 2019

(65) Prior Publication Data

US 2020/0136939 A1 Apr. 30, 2020

Related U.S. Application Data

(63) Continuation of application No. 16/663,360, filed on Oct. 25, 2019.

(Continued)

(51) Int. Cl.
| | |
|---|---|
| *H04L 12/26* | (2006.01) |
| *H04L 12/911* | (2013.01) |
| *H04L 29/08* | (2006.01) |
| *H04L 12/24* | (2006.01) |
| *H04L 29/06* | (2006.01) |

(52) U.S. Cl.
CPC ........... *H04L 43/045* (2013.01); *H04L 41/22* (2013.01); *H04L 43/065* (2013.01); *H04L 43/0852* (2013.01); *H04L 43/0894* (2013.01); *H04L 43/10* (2013.01); *H04L 47/822* (2013.01); *H04L 63/1416* (2013.01); *H04L 63/1425* (2013.01); *H04L 63/20* (2013.01); *H04L 67/1002* (2013.01)

(58) Field of Classification Search
CPC .................. H04L 43/045; H04L 67/1002
See application file for complete search history.

(56) References Cited

U.S. PATENT DOCUMENTS

| | | |
|---|---|---|
| 5,109,486 A | 4/1992 | Seymour |
| 5,781,703 A | 7/1998 | Desai et al. |

(Continued)

FOREIGN PATENT DOCUMENTS

| | | |
|---|---|---|
| WO | 2020086956 A1 | 4/2020 |

OTHER PUBLICATIONS

Non-Published commonly Owned U.S. Appl. No. 16/817,604, filed Mar. 12, 2020, 52 pages, VMware, Inc.

(Continued)

*Primary Examiner* — Kristie D Shingles
(74) *Attorney, Agent, or Firm* — Adeli LLP

(57) ABSTRACT

Some embodiments of the invention provide a method for collecting metric values relating to operations of a set of one or more resources executing on host computers in a datacenter. In some embodiments, the method hierarchically collects and analyzes samples, with a first set of samples collected and analyzed in the data plane, and a second set of samples collected and analyzed in the control plane by aggregating the samples collected in the data plane. In some embodiments, the data plane includes host computers on which sample collecting engines (e.g., service engines) execute, while the control plane includes a set of one or more servers that obtains sample data collected by the host computers, and aggregates and analyzes this data.

24 Claims, 16 Drawing Sheets

Related U.S. Application Data

(60) Provisional application No. 62/751,114, filed on Oct. 26, 2018.

(56) References Cited

U.S. PATENT DOCUMENTS

| | | |
|---|---|---|
| 6,148,335 A | 11/2000 | Haggard et al. |
| 6,449,739 B1 | 9/2002 | Landan |
| 6,515,968 B1 | 2/2003 | Combar et al. |
| 6,714,979 B1 | 3/2004 | Brandt et al. |
| 6,792,458 B1 | 9/2004 | Muret et al. |
| 6,792,460 B2 | 9/2004 | Oulu et al. |
| 6,901,051 B1 | 5/2005 | Hou et al. |
| 6,996,778 B2 | 2/2006 | Rajarajan et al. |
| 7,076,695 B2 | 7/2006 | Vlogee et al. |
| 7,130,812 B1 | 10/2006 | Iyer et al. |
| 7,246,159 B2 | 7/2007 | Aggarwal et al. |
| 7,353,272 B2 | 4/2008 | Robertson et al. |
| 7,430,610 B2 | 9/2008 | Pace et al. |
| 7,636,708 B2 | 12/2009 | Garcea et al. |
| 7,701,852 B1 | 4/2010 | Hohn et al. |
| 7,933,988 B2 | 4/2011 | Nasuto et al. |
| 7,990,847 B1 | 8/2011 | Leroy et al. |
| 8,032,896 B2 | 10/2011 | Li et al. |
| 8,112,471 B2 | 2/2012 | Wei et al. |
| 8,131,712 B1 | 3/2012 | Thambidorai et al. |
| 8,499,066 B1 | 7/2013 | Zhang et al. |
| 8,588,069 B2 | 11/2013 | Todd et al. |
| 8,856,797 B1 | 10/2014 | Siddiqui et al. |
| 8,874,725 B1 | 10/2014 | Ganjam et al. |
| 9,032,078 B2 | 5/2015 | Beerse et al. |
| 9,210,056 B1 | 12/2015 | Choudhary et al. |
| 9,288,193 B1 | 3/2016 | Gryb et al. |
| 9,300,552 B2 | 3/2016 | Dube et al. |
| 9,459,980 B1 | 10/2016 | Arguelles |
| 9,467,476 B1 | 10/2016 | Shieh et al. |
| 9,477,784 B1 | 10/2016 | Bhave et al. |
| 9,483,286 B2 | 11/2016 | Basavaiah et al. |
| 9,495,222 B1 | 11/2016 | Jackson |
| 9,531,614 B1 | 12/2016 | Nataraj et al. |
| 9,558,465 B1 | 1/2017 | Arguelles et al. |
| 9,571,516 B1 | 2/2017 | Curcio et al. |
| 9,608,880 B1 | 3/2017 | Goodall |
| 9,613,120 B1 | 4/2017 | Kharatishvili et al. |
| 9,626,275 B1 | 4/2017 | Hitchcock et al. |
| 9,674,302 B1 | 6/2017 | Khalid et al. |
| 9,680,699 B2 | 6/2017 | Cohen et al. |
| 9,692,811 B1 | 6/2017 | Tajuddin et al. |
| 9,697,316 B1 | 7/2017 | Taylor et al. |
| 9,712,410 B1 | 7/2017 | Char et al. |
| 9,716,617 B1 | 7/2017 | Ahuja et al. |
| 9,729,414 B1 | 8/2017 | Oliveira et al. |
| 9,749,888 B1 | 8/2017 | Colwell et al. |
| 9,830,192 B1 | 11/2017 | Crouchman et al. |
| 9,935,829 B1 | 4/2018 | Miller et al. |
| 9,967,275 B1 | 5/2018 | Kolman et al. |
| 10,003,550 B1 | 6/2018 | Babcock et al. |
| 10,212,041 B1 | 2/2019 | Rastogi et al. |
| 10,313,211 B1 | 6/2019 | Rastogi et al. |
| 10,372,600 B2 | 8/2019 | Mathur |
| 10,547,521 B1 * | 1/2020 | Roy ................. H04L 43/06 |
| 10,594,562 B1 | 3/2020 | Astogi et al. |
| 10,693,734 B2 | 6/2020 | Rastogi et al. |
| 10,728,121 B1 * | 7/2020 | Chitalia ................. H04L 41/12 |
| 10,873,541 B2 | 12/2020 | Callau et al. |
| 10,931,548 B1 | 2/2021 | Iyer et al. |
| 10,999,168 B1 | 5/2021 | Gupta et al. |
| 2002/0078150 A1 | 6/2002 | Thompson et al. |
| 2002/0198984 A1 | 12/2002 | Goldstein et al. |
| 2002/0198985 A1 | 12/2002 | Fraenkel et al. |
| 2003/0191837 A1 | 10/2003 | Chen |
| 2003/0236877 A1 | 12/2003 | Allan |
| 2004/0054680 A1 | 3/2004 | Kelley et al. |
| 2004/0064552 A1 | 4/2004 | Chong et al. |
| 2004/0103186 A1 | 5/2004 | Casati et al. |
| 2004/0243607 A1 | 12/2004 | Tummalapalli |
| 2005/0010578 A1 | 1/2005 | Doshi |
| 2005/0060574 A1 | 3/2005 | Klotz et al. |
| 2005/0108444 A1 | 5/2005 | Flauaus et al. |
| 2005/0120160 A1 | 6/2005 | Plouffe et al. |
| 2005/0172018 A1 | 8/2005 | Devine et al. |
| 2005/0188221 A1 | 8/2005 | Motsinger et al. |
| 2006/0167939 A1 | 7/2006 | Seidman et al. |
| 2006/0242282 A1 | 10/2006 | Mullarkey |
| 2006/0271677 A1 | 11/2006 | Mercier |
| 2007/0226554 A1 | 9/2007 | Greaves et al. |
| 2008/0104230 A1 | 5/2008 | Nasuto et al. |
| 2008/0126534 A1 | 5/2008 | Mueller et al. |
| 2009/0154366 A1 | 6/2009 | Rossi |
| 2009/0199196 A1 | 8/2009 | Peracha |
| 2010/0279622 A1 | 11/2010 | Shuman et al. |
| 2011/0126111 A1 | 5/2011 | Gill et al. |
| 2011/0196890 A1 | 8/2011 | Pfeifle et al. |
| 2012/0101800 A1 | 4/2012 | Miao et al. |
| 2012/0110185 A1 | 5/2012 | Ganesan et al. |
| 2012/0254443 A1 | 10/2012 | Ueda |
| 2012/0254444 A1 | 10/2012 | Harchol-Balter et al. |
| 2013/0013953 A1 | 1/2013 | Eck et al. |
| 2013/0086230 A1 | 4/2013 | Guerra et al. |
| 2013/0086273 A1 | 4/2013 | Wray et al. |
| 2013/0179289 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0211559 A1 | 8/2013 | Lawson et al. |
| 2013/0212257 A1 | 8/2013 | Murase et al. |
| 2013/0343213 A1 | 12/2013 | Reynolds et al. |
| 2013/0346594 A1 | 12/2013 | Banerjee et al. |
| 2014/0006862 A1 | 1/2014 | Jain et al. |
| 2014/0143406 A1 | 5/2014 | Malhotra et al. |
| 2014/0173675 A1 | 6/2014 | Ahmed et al. |
| 2014/0215058 A1 | 7/2014 | Vicat-Blanc et al. |
| 2014/0215621 A1 | 7/2014 | Xaypanya et al. |
| 2014/0229706 A1 | 8/2014 | Kuesel et al. |
| 2014/0282160 A1 | 9/2014 | Zarpas |
| 2014/0304414 A1 | 10/2014 | Yengalasetti et al. |
| 2014/0344439 A1 | 11/2014 | Kempf et al. |
| 2015/0058265 A1 | 2/2015 | Padala et al. |
| 2015/0074679 A1 | 3/2015 | Fenoglio et al. |
| 2015/0081880 A1 | 3/2015 | Eaton et al. |
| 2015/0124640 A1 | 5/2015 | Chu et al. |
| 2015/0134831 A1 | 5/2015 | Hiroishi |
| 2015/0199219 A1 | 7/2015 | Kim et al. |
| 2015/0212829 A1 | 7/2015 | Kupershtok et al. |
| 2015/0278061 A1 | 10/2015 | Siciliano et al. |
| 2015/0288682 A1 | 10/2015 | Bisroev et al. |
| 2015/0293954 A1 | 10/2015 | Hsiao et al. |
| 2015/0295780 A1 | 10/2015 | Hsiao et al. |
| 2015/0295796 A1 | 10/2015 | Hsiao et al. |
| 2015/0358391 A1 | 12/2015 | Moon et al. |
| 2015/0370852 A1 | 12/2015 | Shastry et al. |
| 2016/0064277 A1 | 3/2016 | Park et al. |
| 2016/0094410 A1 | 3/2016 | Anwar et al. |
| 2016/0094431 A1 | 3/2016 | Hall et al. |
| 2016/0094483 A1 | 3/2016 | Johnston et al. |
| 2016/0105335 A1 | 4/2016 | Choudhary et al. |
| 2016/0127204 A1 | 5/2016 | Dzaki et al. |
| 2016/0164738 A1 | 6/2016 | Pinski et al. |
| 2016/0182399 A1 | 6/2016 | Zadka et al. |
| 2016/0217022 A1 | 7/2016 | Velipasaoglu et al. |
| 2016/0294722 A1 | 10/2016 | Bhatia et al. |
| 2016/0323377 A1 | 11/2016 | Einkauf et al. |
| 2016/0359719 A1 | 12/2016 | Travostino |
| 2017/0041386 A1 | 2/2017 | Bhat et al. |
| 2017/0063933 A1 | 3/2017 | Shieh et al. |
| 2017/0093986 A1 | 3/2017 | Kim et al. |
| 2017/0134481 A1 | 5/2017 | Decusatis et al. |
| 2017/0331907 A1 | 11/2017 | Jagannath et al. |
| 2018/0004582 A1 | 1/2018 | Hallenstål |
| 2018/0018244 A1 | 1/2018 | Yoshimura et al. |
| 2018/0041408 A1 | 2/2018 | Dagum et al. |
| 2018/0041470 A1 | 2/2018 | Schultz et al. |
| 2018/0046482 A1 | 2/2018 | Karve et al. |
| 2018/0063193 A1 | 3/2018 | Chandrashekhar et al. |
| 2018/0088935 A1 | 3/2018 | Church et al. |

(56) References Cited

U.S. PATENT DOCUMENTS

| | | | |
|---|---|---|---|
| 2018/0089328 | A1 | 3/2018 | Bath et al. |
| 2018/0136931 | A1 | 5/2018 | Hendrich et al. |
| 2018/0287902 | A1* | 10/2018 | Chitalia ............... G06F 11/327 |
| 2018/0309637 | A1 | 10/2018 | Gill et al. |
| 2018/0335946 | A1 | 11/2018 | Wu et al. |
| 2019/0123970 | A1 | 4/2019 | Rastogi et al. |
| 2019/0199790 | A1 | 6/2019 | Yang et al. |
| 2020/0136942 | A1 | 4/2020 | Rastogi et al. |
| 2020/0169479 | A1 | 5/2020 | Ireland |
| 2020/0287794 | A1 | 9/2020 | Rastogi et al. |
| 2020/0382390 | A1 | 12/2020 | Basavaiah et al. |
| 2020/0382584 | A1 | 12/2020 | Basavaiah et al. |

OTHER PUBLICATIONS

PCT International Search Report and Written Opinion of Commonly Owned International Patent Application PCT/US2019/058054, dated Jan. 30, 2020, 16 pages, International Searching Authority (EPO).
Author Unknown, "Autoscaler," Compute Engine—Google Cloud Platform, Jun. 29, 2015, 6 pages, retrieved at http://web.archive.org/web/20150629041026/https://cloud.google.com/compute/docs/autoscaler/.
Author Unknown, "Autoscaling," Aug. 20, 2015, 4 pages, Amazon Web Services, retrieved from http://web.archive.org/web/20150820193921/https://aws.amazon.com/autoscaling/.
Catania, V., et al., "PMT: A Tool to Monitor Performances in Distributed Systems," Proceedings of the 3rd IEEE International Symposium on High Performance Distributed Computing, Aug. 2-5, 1994, 8 pages, San Francisco, CA, USA.
Davis, David, "Post #8—Understanding vCenter Operations Badges," David Davis Blog, Apr. 29, 2014, 5 pages, retrieved from http://blogs.vmware.com/management/2014/04/david-davis-on-vcenter-operations-post-8-understanding-vcenter-operations-badges.html.
De George, Andy, "How to Scale an Application," Jun. 16, 2015, 8 pages, Github.com.
Liu, Feng, et al., "Monitoring of Grid Performance Based-on Agent," 2007 2nd International Conference on Pervasive Computing and Applications, Jul. 26-27, 2007, 6 pages, IEEE, Birmingham, UK.
Non-Published commonly owned International Patent Application PCT/US19/58054, filed Oct. 25, 2019, 54 pages, VMware, Inc.
Non-Published commonly owned U.S. Appl. No. 15/055,450, filed Feb. 26, 2016, 37 pages, VMware, Inc.
Non-Published commonly Owned U.S. Appl. No. 15/130,499, filed Apr. 15, 2016, 49 pages, VMware, Inc.
Non-Published commonly Owned U.S. Appl. No. 15/453,258, filed Mar. 8, 2017, 34 pages, VMware, Inc.
Non-Published commonly owned U.S. Appl. No. 15/993,443, filed May 30, 2018, 31 pages, Vmware, Inc.
Non-Published commonly owned U.S. Appl. No. 16/663,360, filed Oct. 25, 2019, 54 pages, VMware, Inc.
Sevcik, Peter, et al., "Apdex Alliance," May 24, 2014, 5 pages, www.apdex.org.
Wallace, Paul, et al., "Feature Brief: Stingray's Autoscaling Capability," Brocade Community Forums, May 1, 2013, 5 pages, retrieved from http://community.brocade.com/t5/vADC-Docs/Feature-Brief-Stingray-s-Autoscaling-capability/ta-p/73843.
Yar, Mohammed, et al., "Prediction Intervals for the Holt-Winters Forecasting Procedure," International Journal of Forecasting, Month Unknown 1990, 11 pages, vol. 6, Issue 1, Elsevier Science Publishers B.V.
Zhang, Xuehai, et al., "A Performance Study of Monitoring and Information Services for Distributed Systems," Proceedings of the 12th IEEE International Symposium on High Performance Distributed Computing, Jun. 22-24, 2003, 12 pages, IEEE Computer Society, Washington, D.C., USA.
Non-Published commonly Owned U.S. Appl. No. 16/905,571, filed Jun. 18, 2020, 40 pages, VMware, Inc.
Author Unknown, "BPF, eBPF, XDP and Bpfilter . . . What are These Things and What do They Mean for the Enterprise?," Apr. 16, 2018, 11 pages, Netronome, retrieved from https://www.netronome.com/blog/bpf-ebpf-xdp-and-bpfilter-what-are-these-things-and-what-do-they-mean-enterprise/.

\* cited by examiner

| Bucket | Sample Count |
|---|---|
| 40 | 450 |
| 50 | 50 |
| 60 | 200 |
| 70 | 125 |
| 80 | 75 |
| 84 | 25 |
| 88 | 25 |
| 92 | 15 |
| 96 | 25 |
| 100 | 10 |

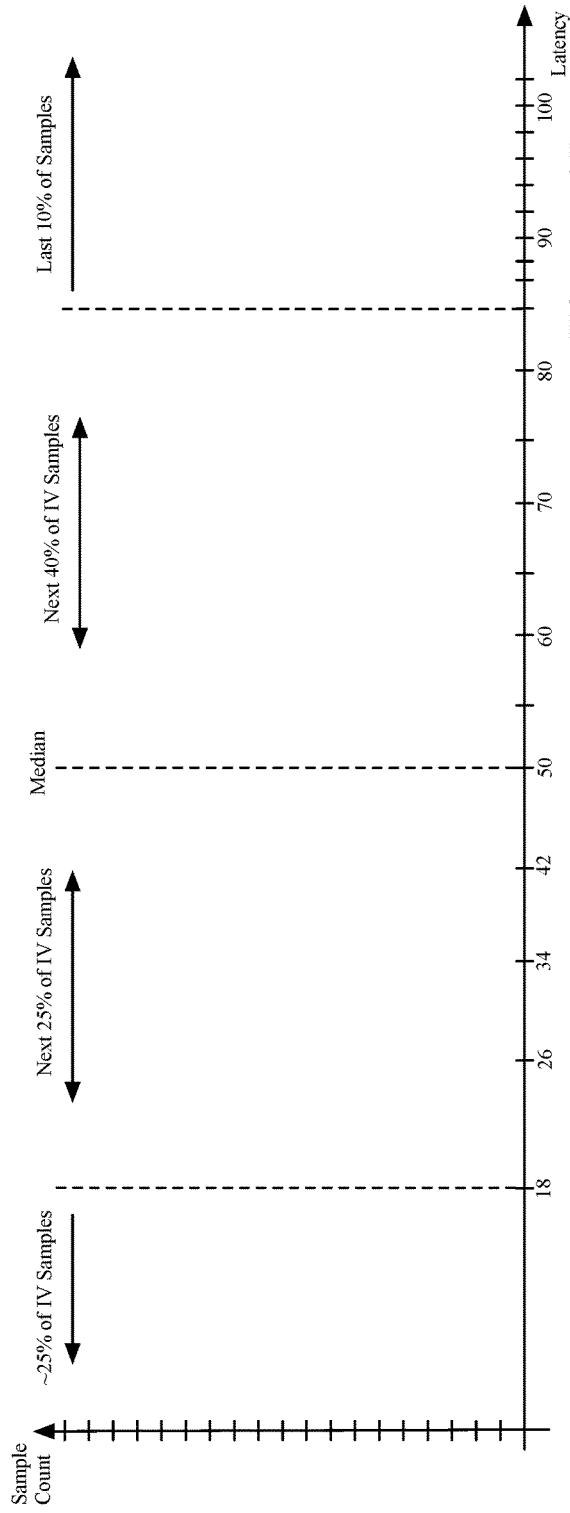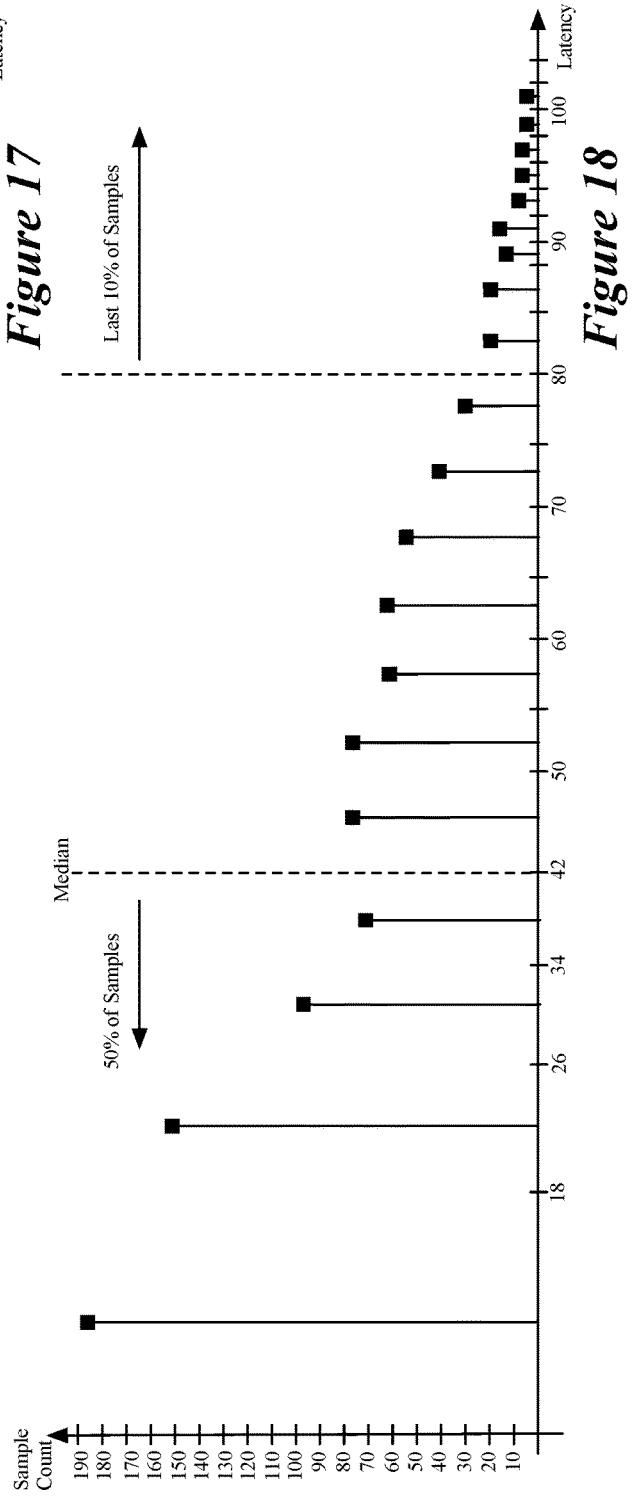

COLLECTING SAMPLES HIERARCHICALLY IN A DATACENTER

BACKGROUND

Metrics (also referred to as performance metrics) are used by computer systems to quantify the measurement of system performance. Metrics are critical for analyzing systems' operations and providing feedback for improvements. In modern computer systems, the quantity of metrics can be large. For example, suppose that a single cloud application collects 1000 metrics for analysis every 5 seconds, which means that 720,000 metrics are collected every hour. In a typical high scale environment such as an enterprise data center that supports thousands of applications each executing on multiple servers, the rate can be on the order of billions of metrics per hour.

Currently, most performance monitoring tools save collected metrics to a database, then perform analysis offline. These tools tend to scale poorly because of the high number of input/output (I/O) operations (such as database reads and writes) required for storing and processing a large number of metrics. Further, these tools typically do not support real time analytics due to the latency and processing overhead in storing and processing metrics data in the database

SUMMARY

Some embodiments of the invention provide a method for collecting metric values relating to operations of a set of one or more resources executing on host computers in a datacenter. In some embodiments, the set of resources includes a set of one or more applications (e.g., a cluster of webservers, application servers or database servers) for which a middlebox service is performed on the host computers, and the metric is the latency experienced by packets processed by the application set.

In some embodiments, the method hierarchically collects and analyzes samples, with a first set of samples collected and analyzed in the data plane, and a second set of samples collected and analyzed in the control plane by aggregating the samples collected in the data plane. In some embodiments, the data plane includes host computers on which sample collecting engines (e.g., service engines) execute, while the control plane includes a set of one or more servers that obtains sample data collected by the host computers, and aggregates and analyzes this data.

At a particular host computer, the method in some embodiments repeatedly identifies different sample values for a particular operational metric. For instance, the method in some embodiments is performed by a service engine that executes on the particular host computer and identifies different latencies experienced by different packets forwarded by the service engine to an application cluster. In some embodiments, the service engine (e.g., service virtual machine or container) is a load balancer, while in other embodiments it is another type of middlebox service engine, such as a firewall engine, an intrusion detecting engine, an intrusion prevention engine, and a network address translating engine, etc.

During a first time period, the method identifies a first set of sample metric values, and generates an individual-value (IV) first histogram that specifies the number of samples that the method has processed for each of several metric values. Based on the IV first histogram, the method specifies several metric value ranges (i.e., several bins) for a sample-value range (SVR) second histogram. During a second time period, the method identifies a second set of sample values, and generates the SVR second histogram to specify a number of samples that the method has processed for each range in a group of the specified ranges in the second histogram.

The method then provides the SVR second histogram to a server to analyze in order to assess the operations of the set of resources in the datacenter. For instance, in some embodiments, the method provides the SVR second histogram to a set of one or more servers to aggregate with SVR second histograms generated by several other host computers for the particular operational metric. The server set then stores the aggregated histogram in a data storage (e.g., in a database), which can be accessed by network administrator to obtain information regarding the collected operational metric. For instance, in some embodiments, the server set provides this data in form of a graphical display of the aggregated histogram, or provides this information in a tabular or text form, e.g., provide latency values for 50%, 90% and 99% of the processed packets.

In some embodiments, the method generates another SVR histogram before generating the SVR second histogram. For instance, in some embodiments, the SVR second histogram in some embodiments has variable-sized bins (i.e., variable-sized ranges, also called variable-sized buckets). Before generating the SVR second histogram with variable-sized bins and providing this to the server, the method in some embodiments generates an SVR third histogram with fixed-sized bins (i.e., with fixed-sized ranges/buckets) from the IV first histogram, and uses this fixed-sized bin SVR histogram to identify (1) the metric values around which the bin sizes of the variable SVR histogram should be defined, and (2) the sizes of these variable bins.

Specifically, for the fixed-sized bin SVR histogram, the method in some embodiments generates fixed-sized bins about the metric values identified along the first histogram. In many cases, the IV first histogram does not have sample values for the full range of possible values that the method might process. To account for this while generating the SVR third histogram bins, the method in some embodiments selects the fixed-sizes of the third-histogram bins to evenly cover the expected range of sample values.

In other embodiments, the method defines an SVR second histogram from the IV first histogram, instead of generating a fixed-sized bin histogram from the IV first histogram. In some of these embodiments, the method defines for the SVR second histogram (1) one bin based on the bottom W % (e.g., 25%) of samples of the IV first histogram, (2) a few bins (e.g., 4 or 5 bins) for the next X % (e.g., next 25%) of samples of the IV first histogram, (3) a larger number of bins (e.g., 5 to 10 bins) for the next Y % (e.g., next 40%) of samples of the IV first histogram, and (4) another number of bins (e.g., 5 bins) for the last Z % (e.g., last 10%) of samples of the IV first histogram. Based on the next set of samples that it processes, the method then generates the SVR second histogram, and then uses this histogram to define the bins for the SVR third histogram. This approach has the advantage of preventing the method from creating too many bins for its second histogram based on outlier sample values identified in the first histogram.

After specifying the locations and sizes of the bins for the SVR third histogram, the method then (1) identifies a third set of sample values in a third time period that is between the first and second time periods during which the method identifies the first and second histograms, and (2) generates the SVR third histogram to specify a number of samples that the method has processed for each of the fixed-sized bins of the third histogram. After generating the SVR third histogram, the method then specifies the locations of the bins and the sizes of the bins for the SVR second histogram from the SVR third histogram.

For instance, when the SVR third histogram has ten buckets with 500 samples corresponding to latencies below 0 to 40 milliseconds (ms), and another ten buckets for 500 samples corresponding to latencies from 40 to 80 ms, the method in some embodiments (1) defines nine buckets for the SVR second histogram, (2) assigns the first bucket to center at 20 ms with a width of 20 ms, (3) assigns the next three buckets of the SVR second histogram to center respectively at 45, 55, and 65 ms, each with a width of 10 ms, and (4) assigns the last five buckets of the SVR second histogram to center respectively at 71, 73, 75, 77 and 79 ms, each with a width of 2 ms.

This approach is optimized to identify the maximum latency values experienced by 50%, 90% and 99% of the samples, as it creates the first bucket to encompass the bottom 50% of sample value range that it identified in the SVR third histogram, creates three buckets for the next 40% of the expected sample value range, and then creates five buckets for the last 10% of the expected sample value range. The position and sizes of these bins in the SVR second histogram were driven by the content of the SVR third histogram, which has its bins determined by the content of the IV first histogram, as mentioned above.

In addition to generating the SVR second histogram, the method of some embodiments iteratively performs a range-modification process to modify the locations and/or sizes of the bins of the SVR second histogram. For instance, after providing the SVR second histogram to the server set, the method of some embodiments modifies at least two ranges (bins) specified for the SVR second histogram based on the number of sample values that the generated SVR second histogram specifies for its bins, and generates a new SVR second histogram for the next batch of samples that it processes based on these modified bins.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

FIG. 17 illustrates another example of a variable-sized bins generated for a variable-bin histogram.

FIG. 18 illustrates another example of a variable-sized bin histogram

DETAILED DESCRIPTION

Figure 1:
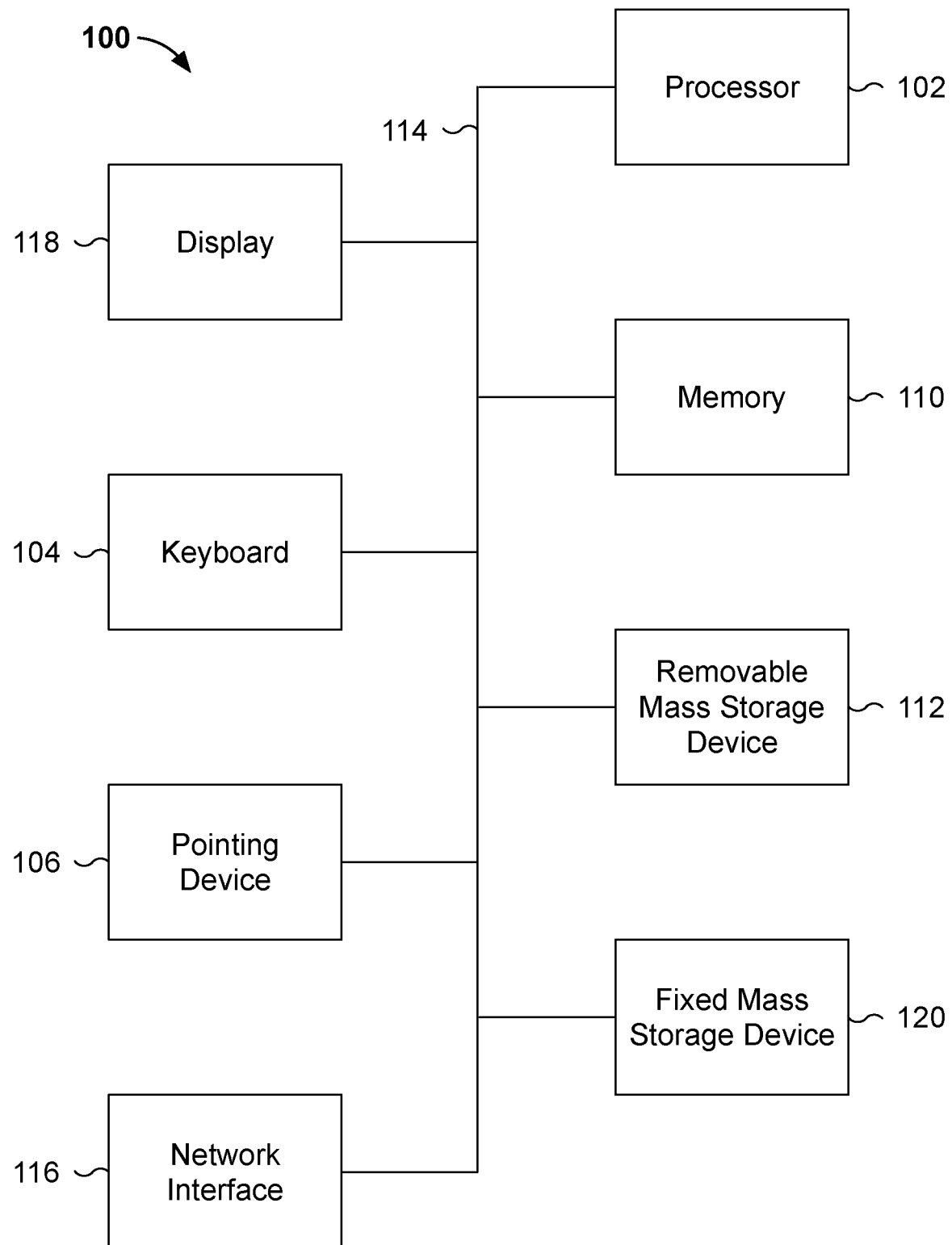
FIG. 1 is a functional diagram illustrating a programmed computer system for managing metrics in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Metrics (also referred to as performance metrics) are used by computer systems to quantify the measurement of system performance. Metrics are critical for analyzing systems' operations and providing feedback for improvements. In modern computer systems, the quantity of metrics can be large. For example, suppose that a single cloud application collects 1000 metrics for analysis every 5 seconds, which means that 720,000 metrics are collected every hour. In a typical high scale environment such as an enterprise data center that supports thousands of applications each executing on multiple servers, the rate can be on the order of billions of metrics per hour. Analysis of metrics is further complicated by the distributed nature of some systems. In the distributed networks, each subsystem may only handle a small portion of the tasks in the network. Thus, each subsystem may only provide metrics data for a limited portion of the activities for the network.

Currently, most performance monitoring tools save collected metrics to a database, then perform analysis offline. These tools tend to scale poorly because of the high number of input/output (I/O) operations (such as database reads and writes) required for storing and processing a large number of metrics. Further, these tools typically do not support real time analytics due to the latency and processing overhead in storing and processing metrics data in the database.

A method and system for characterizing performance for a distributed system are described. The method includes obtaining a plurality of sets of performance metrics from a plurality of sources in the distributed network. Statistical summaries are generated for the sets of performance metrics. A system-level statistical description of distributed network's performance is provided using the statistical summaries.

FIG. 1 is a functional diagram illustrating a programmed computer system for managing metrics in accordance with some embodiments. As will be apparent, other computer system architectures and configurations can be used to manage and process metrics. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide server functions described below with respect to server 202, etc. of FIG. 2.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing.

Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
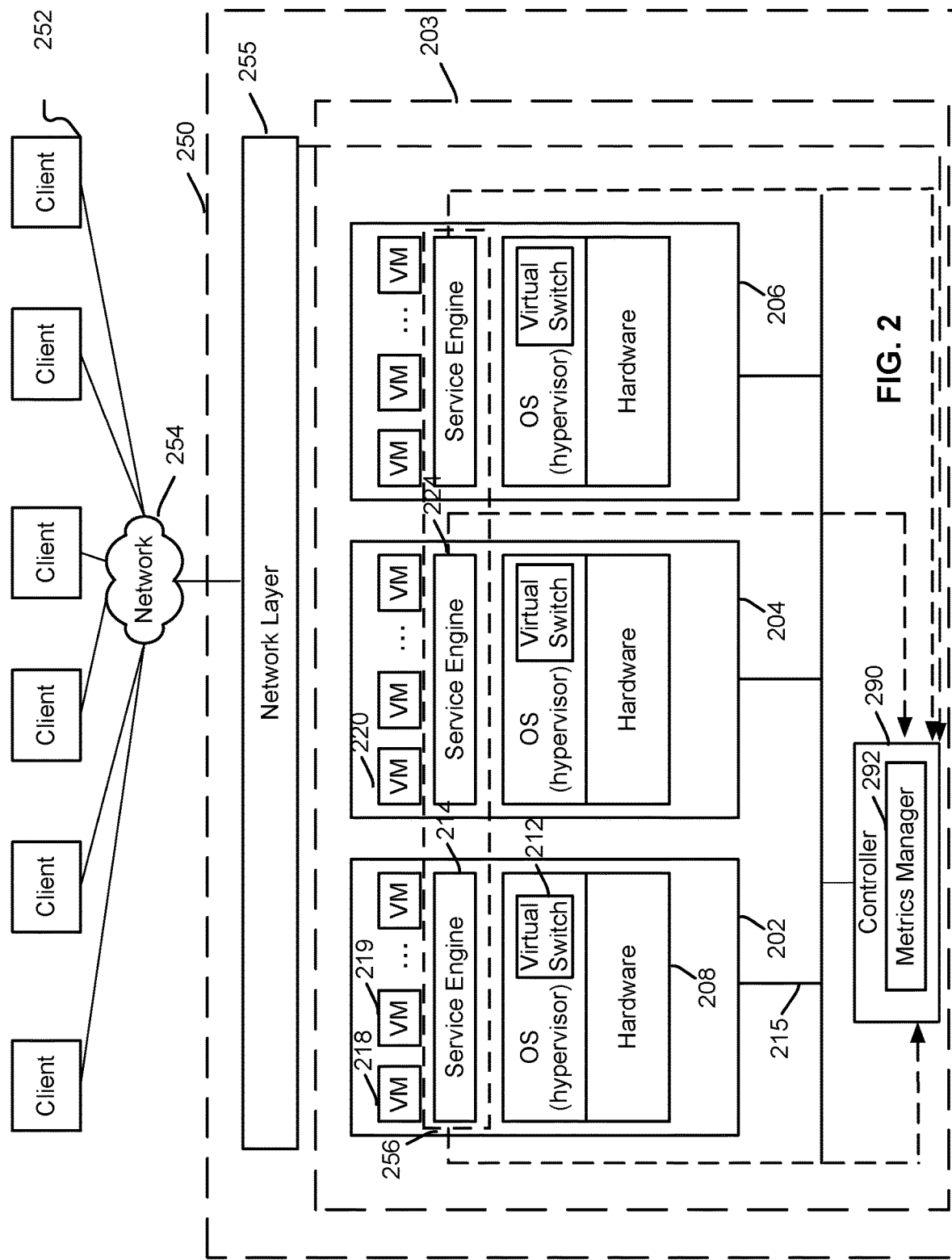
FIG. 2 is a block diagram illustrating an embodiment of a data center that includes a scalable distributed metrics manager.

FIG. 2 is a block diagram illustrating an embodiment of a data center that includes a scalable distributed metrics manager and that may provide distributed network services. In this example, client devices such as 252 connect to a data center 250 via a network 254. A client device can be a laptop computer, a desktop computer, a tablet, a mobile device, a smart phone, a wearable networking device, or any other appropriate computing device. In some embodiments, a web browser and/or a standalone client application is installed at each client, enabling a user to use the client device to access certain applications hosted by data center 250. Network 254 can be the Internet, a private network, a hybrid network, or any other communications network.

In the example shown, a networking layer 255 comprising networking devices such as routers, switches, etc. forwards requests from client devices 252 to a distributed network service platform 203. In this example, distributed network service platform 203 includes a number of servers configured to provide a distributed network service. A physical server (e.g., 202, 204, 206, etc.) has hardware components and software components, and may be implemented using a device such as 100. In this example, hardware (e.g., 208) of the server supports operating system software in which a number of virtual machines (VMs) (e.g., 218, 219, 220, etc.) are configured to execute. A VM is a software implementation of a machine (e.g., a computer) that simulates the way a physical machine executes programs. The part of the server's operating system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include the VMware Workstation® and Oracle VM VirtualBox®. Although physical servers supporting VM architecture are shown and discussed extensively for purposes of example, physical servers supporting other architectures such as container-based architecture (e.g., Kubernetes®, Docker®, Mesos®), standard operating systems, etc., can also be used and techniques described herein are also applicable. In a container-based architecture, for example, the applications are executed in special containers rather than virtual machines.

In some embodiments, instances of applications are configured to execute within the VMs. Examples of such applications include web applications such as shopping cart, user authentication, credit card authentication, email, file sharing, virtual desktops, voice/video streaming, online collaboration, and many others.

One or more service engines (e.g., 214, 224, etc.) are instantiated on a physical device. In some embodiments, a service engine is implemented as software executing in a virtual machine. The service engine is executed to provide distributed network services for applications executing on the same physical server as the service engine, and/or for applications executing on different physical servers. In some embodiments, the service engine is configured to enable appropriate service components that implement service logic. For example, a load balancer component is executed to provide load balancing logic to distribute traffic load amongst instances of applications executing on the local physical device as well as other physical devices; a firewall component is executed to provide firewall logic to instances of the applications on various devices; a metrics agent component is executed to gather metrics associated with traffic, performance, etc. associated with the instances of the applications, etc. Many other service components may be implemented and enabled as appropriate. When a specific service is desired, a corresponding service component is configured and invoked by the service engine to execute in a VM.

In the example shown, traffic received on a physical port of a server (e.g., a communications interface such as Ethernet port 215) is sent to a virtual switch (e.g., 212). In some embodiments, the virtual switch is configured to use an API provided by the hypervisor to intercept incoming traffic designated for the application(s) in an inline mode, and send the traffic to an appropriate service engine. In inline mode, packets are forwarded on without being replicated. As shown, the virtual switch passes the traffic to a service engine in the distributed network service layer (e.g., the service engine on the same physical device), which transforms the packets if needed and redirects the packets to the appropriate application. The service engine, based on factors such as configured rules and operating conditions, redirects the traffic to an appropriate application executing in a VM on a server. Details of the virtual switch and its operations are outside the scope of the present application.

Controller 290 is configured to control, monitor, program, and/or provision the distributed network services and virtual machines. In particular, the controller includes a metrics manager 292 configured to collect performance metrics and perform analytical operations. The controller can be implemented as software, hardware, firmware, or any combination thereof. In some embodiments, the controller is implemented on a system such as 100. In some cases, the controller is implemented as a single entity logically, but multiple instances of the controller are installed and executed on multiple physical devices to provide high availability and increased capacity. In embodiments implementing multiple controllers, known techniques such as those used in distributed databases are applied to synchronize and maintain coherency of data among the controller instances.

Within data center 250, one or more controllers 290 gather metrics data from various nodes operating in the data center. As used herein, a node refers to a computing element that is a source of metrics information. Examples of nodes include virtual machines, networking devices, service engines, or any other appropriate elements within the data center.

Many different types of metrics can be collected by the controller. For example, since traffic (e.g., connection requests and responses, etc.) to and from an application will pass through a corresponding service engine, metrics relating to the performance of the application and/or the VM executing the application can be directly collected by the corresponding service engine. As another example, to collect metrics relating to client responses, a service engine sends a script to a client browser or client application. The script measures client responses and returns one or more collected metrics back to the service engine. In both cases, the service engine sends the collected metrics to controller 290. Additionally, infrastructure metrics relating to the performance of other components of the service platform (e.g., metrics relating to the networking devices, metrics relating to the performance of the service engines themselves, metrics relating to the host devices such as data storage as well as operating system performance, etc.) can be collected by the controller. Specific examples of the metrics include round trip time, latency, bandwidth, number of connections, etc.

The components and arrangement of distributed network service platform 203 described above are for purposes of illustration only. The technique described herein is applicable to network service platforms having different components and/or arrangements.

Figure 3:
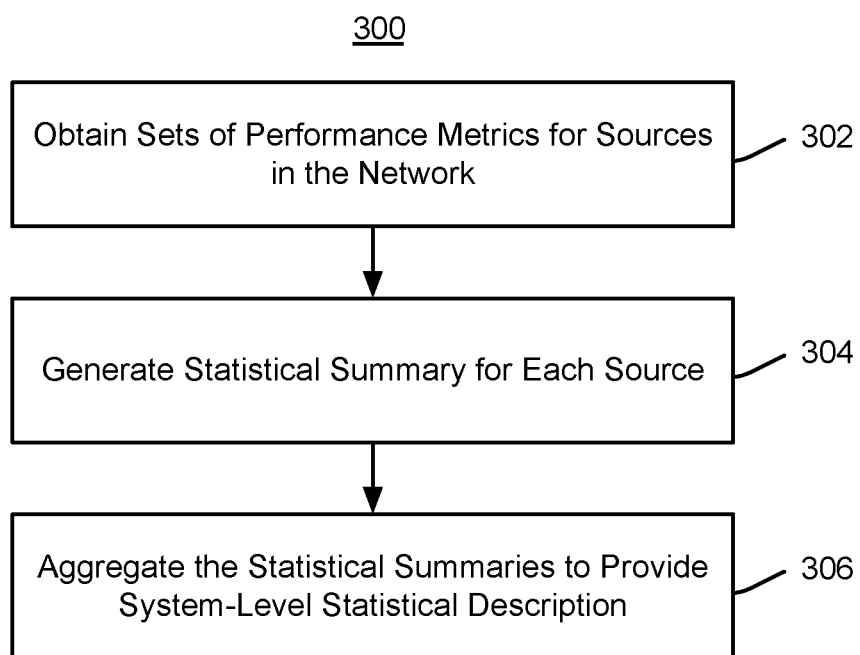
FIG. 3 is a flow chart illustrating an embodiment of a process for statistically characterizing the performance of a distributed network.

FIG. 3 is a flow chart illustrating an embodiment of a process for statistically characterizing the performance of a distributed network, such as a network employing the system 200. In some embodiments, the process 300 may be implemented using the service engines 214, 224 and/or the controller 290. Consequently, the method 300 is described in the context of the system 200. In other embodiments, other and/or additional components may be used to analyze performance of the distributed network.

Performance metrics are obtained for the sources in the distributed network 200, in step 302. Step 302 may include collecting performance data for clients, service engines, or other components in the system 200. The data may be collected by the service engine itself, by a metrics agent, by a script sent by the service engine to another component or in another manner. For example, each service engine (214, 224, etc.) may determine the latency for each transaction completed by through service engine over a particular time interval. Other metrics, such as client responses, connections, available storage or bandwidth might also be monitored via scripts sent to the client or other component. Components, such as one or more of the VMs (218, 219, 220 . . . ), may be configured to report selected performance metrics at regular intervals or in response to specific events. Thus, the metrics data obtained in step 302 may be from components such as applications, VMs and/or clients that are spread out over multiple physical machines. Data related to such performance metrics are provided to the corresponding service engines.

Using the information obtained in step 302, statistical summaries are generated, via step 304. Generation of the statistical summary includes calculating a number of statistical values describing the performance metrics. A single statistical summary may be provided for all performance metrics related to the source. In other embodiments, a separate statistical summary may be provided for each performance metric of each source. For example, a statistical summary may be provided for only transaction latencies for each service engine in step 304. Alternatively, a single statistical summary provided in step 304 may incorporate not only transaction latencies, but also other performance characteristics of the service engine or other component. The service engine(s) for may generate the statistical summaries in step 304.

The statistical summaries provided in step 304 statistically describes the performance of the service engine or other component(s). Thus, raw data for the performance metrics need not be stored in a central storage device. Instead, the statistical summary provides an adequate description of the performance metric using the quantities calculated and stored in step 304. The statistical summary may include one or more of the number of data points for the performance metric, a mean value, a standard of deviation, a variance, a confidence interval, a minimum value, a maximum value and/or other statistical quantities of interest. For example, the statistical summary for the latencies of transactions managed by a service engine may include one or more of the number of transactions completed in the time interval, the mean latency, the standard of deviation in the latency, the variance in the latency, the confidence interval for the latency, the minimum latency for the interval and the maximum latency for the interval. The confidence indicator is a measure of the values for a certain percentage of the sample space. For example, the confidence indicator may be the range of latencies for ninety percent of the transactions occurring during the interval. The confidence interval may thus be represented by a range of values up to the ninetieth percentile of the sample space and the number of values within that percentile. For a service engine completing two hundred transactions over the interval, ninety percent of which were completed by one second, the confidence interval may be one second (the range of latencies for the ninetieth percentile) and the one hundred and eighty (the ninety percent of the transactions). In alternate embodiments, other and/or additional quantities might be included in the statistical summary.

The statistical summaries are aggregated to provide a system-level statistical description for the distributed network at step 306. Step 306 may be carried out by the controller 290. Thus, the service engines may provide their statistical summaries to the controller 290, which combines the summaries in a manner that preserves the statistical information in the summaries and generalizes the information to the entire network (or predefined portion thereof). In some embodiments, the metrics manager 292 carries out this function. In other embodiments, step 306 may be performed by other/additional component(s). The system-level statistical description statistically characterizes the performance of the entire distributed network (or subset of the distributed network including multiple service engines) in a probabilistic fashion. The system-level statistical description may include a total number of data points for the performance metric, a system-level mean value, a system-level standard of deviation, a system-level variance, a system-level confidence interval, a system-level minimum value and a system-level maximum value. In the example of transaction latency above, the system-level statistical description may include the total number of transactions in the distributed network completed over the interval, the system-level mean latency, the system-level standard of deviation in latency, the system-level variance in latency, a system-level confidence interval for latency, a system-level minimum latency and a system-level maximum latency.

The aggregation in step 306 may be carried out in a number of manners that are consistent with statistical/probability rubrics. In some embodiments, a weighted sum of each of the statistical quantities in the statistical summaries for each metric is calculated. For latencies, the mean value, standard of deviation, variance, confidence interval, minimum value and maximum value may be weighted by a measure of the number of transactions for the service engine over the corresponding time interval. For example, the quantities above may be weighted by the number of transactions for the service engine or by the fraction of the total number of transactions that are completed for the service engine. Other mechanisms for weighting and/or integrating the values in each summary that are statistically valid may be used. Consequently, the system-level values are based on the values in each statistical summary but account for the fraction of the sample space represented by the summary.

Using the method 300, the system-level performance of a distributed network is determined using statistical summaries of the individual service engines. Consequently, the system-level statistical description may be rapidly obtained, without requiring raw data for the performance metrics to be transferred to a mass storage device or other component, stored and/or analyzed in bulk. Instead, the system-level statistical description may be used. Further, other quantities of interest may be calculated using the system-level statistical description. Real time or quasi-real time performance may be determined and adjustments to system operation may be made.

Figure 4:
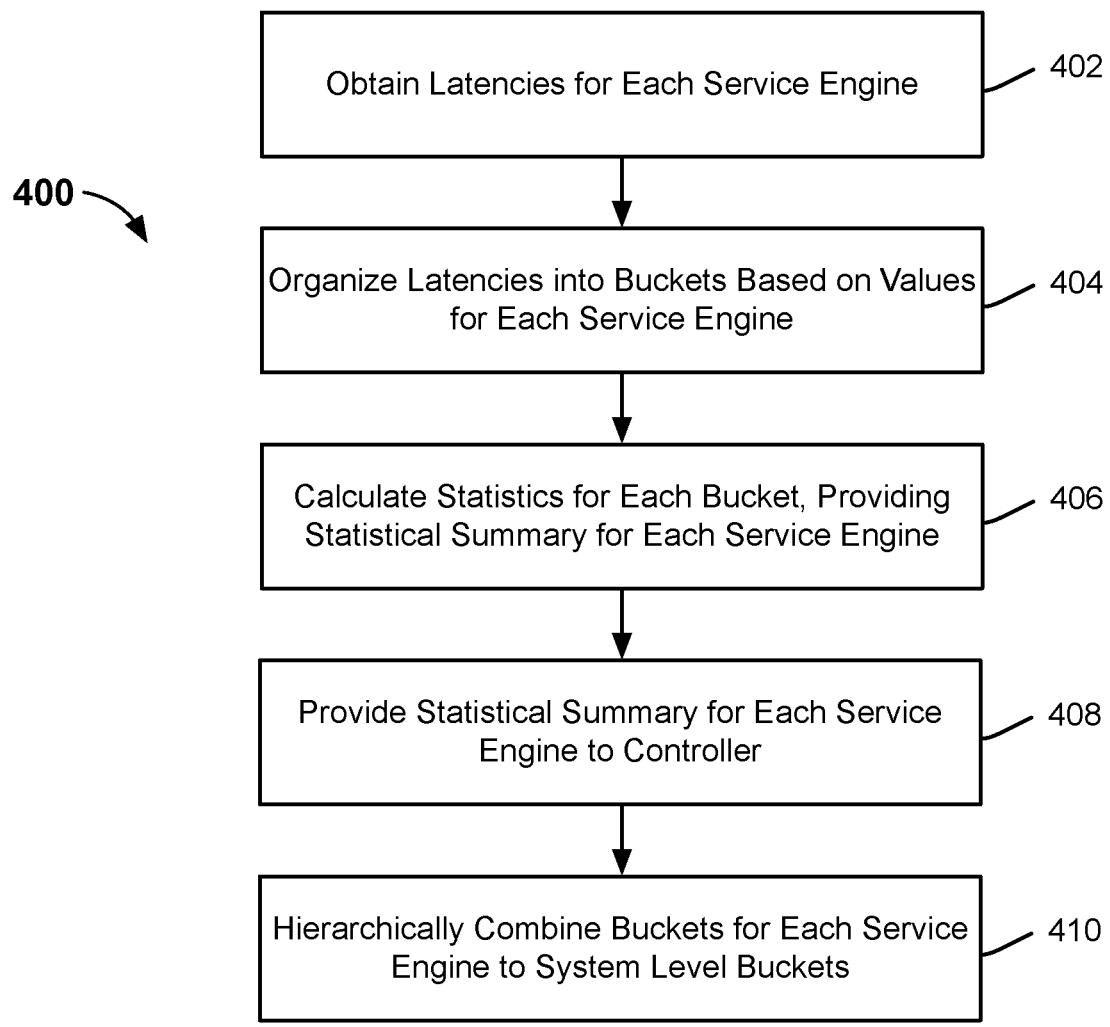
FIG. 4 is a flow chart illustrating an embodiment of a process for statistically characterizing transaction latency in a distributed network.

FIG. 4 is a flow chart illustrating an embodiment of a method 400 for statistically characterizing the transaction latency of a distributed network, such as one utilizing the system 200. In some embodiments, the process 400 may be implemented using service engines and controller such as the service engines 214, 224 and the controller 290. Consequently, the method 400 is described in the context of the system 200. In other embodiments, other and/or additional components may be used to analyze performance of the distributed network. The method 400 is also described in the context of transaction latency as the performance metric being analyzed. However, the method 400 may be applied to other performance metrics.

The transaction latencies are obtained for the service engines in the distributed network, in step 402. Step 402 may include each service engine determining the latencies for transactions completed for the service engine over a specific time period. As discussed above, metrics agents, scripts or other data collection mechanisms might also be used.

The latencies are organized into buckets based on latency value, at step 404. Each bucket corresponds to a certain percentile for latency. For example, if ten buckets are used, each bucket may correspond to ten percentiles. For example, bucket 1 may be for transactions having the lowest latencies from zero through the tenth percentile, bucket 2 may be for transactions having the next lowest latencies greater than the tenth percentile and not more than the twentieth percentile, and so on. In another embodiment, another number of buckets may be used. For example, each service engine might organize latencies into twenty buckets, with each bucket corresponding to five percentiles. All service engines may use the same number of buckets. In alternate embodiments, different service engines may use a different number of buckets. Because the latencies are stored in buckets based on each latency's value, buckets generally include data for a different number of transactions.

The desired statistics are calculated for each bucket in each service engine, at step 406. For example, the statistics calculated for each bucket may include the number of transactions in the bucket, a mean value of the latencies in the bucket, a standard of deviation in the latencies for the bucket, a variance in latency for the bucket during the interval, a confidence interval for the bucket's latencies, a minimum latency for the bucket over the interval, and a maximum latency for the bucket during the interval. The statistics calculated for all of the buckets for the service engine may be considered to be the statistical summary for the service engine. Thus, steps 404 and 406 may correspond to step 304 of the method 300 (determining the statistical summary for the service engine).

The statistical summaries for each service engine are provided to the controller, via step 408. Thus, the statistics for the buckets of the service engine are transmitted to the controller. Because statistical analysis has already been carried out for the data collected in step 402 for each service engine, raw data need not be transmitted from the service engines to the controller.

The buckets for the service engines are combined by the controller 290 in a manner consistent with statistical guidelines, thereby providing system-level buckets, via step 410. The controller 290 thus generates the system-level statistical description for the distributed network. The controller may hierarchically combine the buckets by merging buckets two buckets at each level until the number of buckets for all the service engines have been combined into the desired number of system-level buckets. Merging the buckets may include providing a weighted sum of the values in each bucket. Other statistically acceptable methods may also be used. In some embodiments, the number of system-level buckets is the same as the number of buckets for each service engine. The combining in step 410 is performed so that each system-level bucket includes statistics for system-wide transactions that are in the appropriate percentile. For example, system-level bucket 1 may be for all transactions in the network having the lowest latencies from zero through the tenth percentile, system-level bucket 2 may be for all transactions in the network having the next lowest latencies greater than the tenth percentile and not exceeding the twentieth percentile, and so on. Because the buckets are combined in step 410, each system-level bucket may include a total number of transactions for that bucket's percentile range, a system-level mean latency for that percentile range, a system-level latency standard of deviation for that percentile range, a system-level variance in latency for that percentile range, a system-level confidence interval for that percentile range, a system-level minimum latency for that percentile range and a system-level maximum latency for that percentile range. The combination of the statistics in the system-level buckets may be considered to form the system-level statistical description for the latency.

Figure 5:
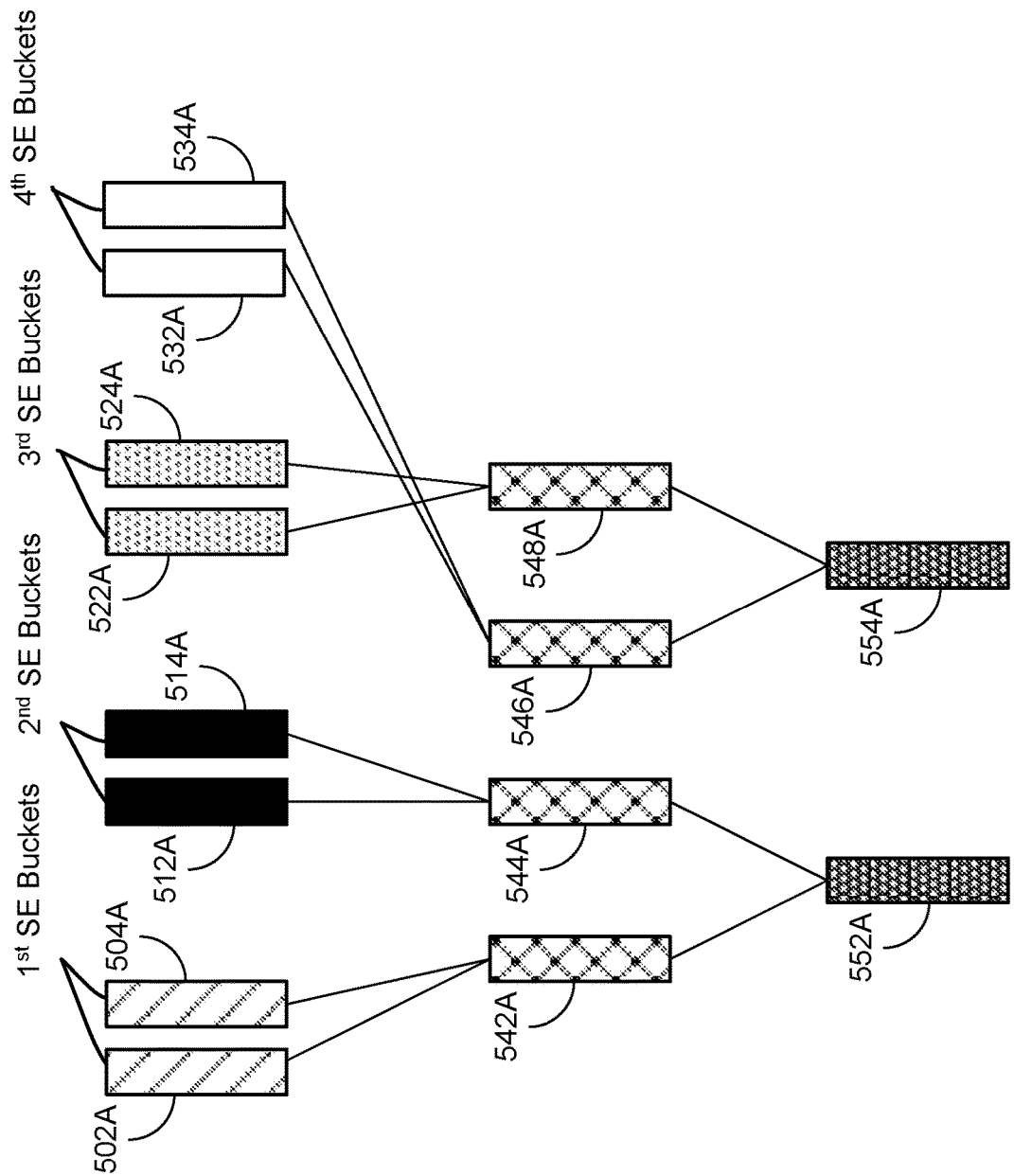
FIG. 5 is a block diagram depicting the merging of buckets in an exemplary embodiment of a distributed network.

The merging of buckets in step 410 may be carried out in a number of manners. In some embodiments, a weighted sum of each of the statistical quantities for each bucket being combined is calculated. For example, the merged mean may be determined by multiplying the mean of the first bucket by the number of transactions for the first bucket, adding the mean of the second bucket by the number of transactions for the second bucket and dividing the quantity by the sum of the transactions in the first and second buckets. Thus, the transactions serviced by each service engine and the total number of transactions for the system may be used in step 410. Further, the merging of buckets in step 410 may take into account the range of values in each bucket. In some cases, the ranges of values in different service engines do not overlap. In such an embodiment, the merging in step 410 may be simplified. For example, FIG. 5 depicts the merging of buckets for four service engines having ranges that do not overlap and which have a similar number of transactions. Service engine 1 ($1^{st}$ SE) has buckets 502A and 504A. Service engine 2 ($2^{nd}$ SE) has two buckets 512A and 514A. The $3^{rd}$ SE has buckets 522A and 524A. The 4th SE has buckets 532A and 534A. Thus, each bucket (502A, 504A, 512A, . . . ) describes fifty percent of the transactions serviced by the corresponding service engine. The $1^{st}$ SE has the lowest latencies, the $2^{nd}$ SE has the next lowest latencies, the $4^{th}$ SE has the next to highest latencies and the $3^{rd}$ SE has the highest latencies. Thus, the buckets for each service engine are merely combined, for example via a weighted sum. Buckets 502A and 504A and combined into 542A. Buckets 512A and 514A are combined to bucket 544A. Buckets 522A and 524A and buckets 532 and 534A are combined to buckets 548A and 546A, respectively. In this example, the service engines process approximately the same number of transactions. If, however, the number of transactions varied sufficiently between service engines, the buckets 502A through 534A might be combined in another manner. The buckets 542A, 544A, 546A and 548A are merged to system-level buckets 552A and 554A.

Figure 6:
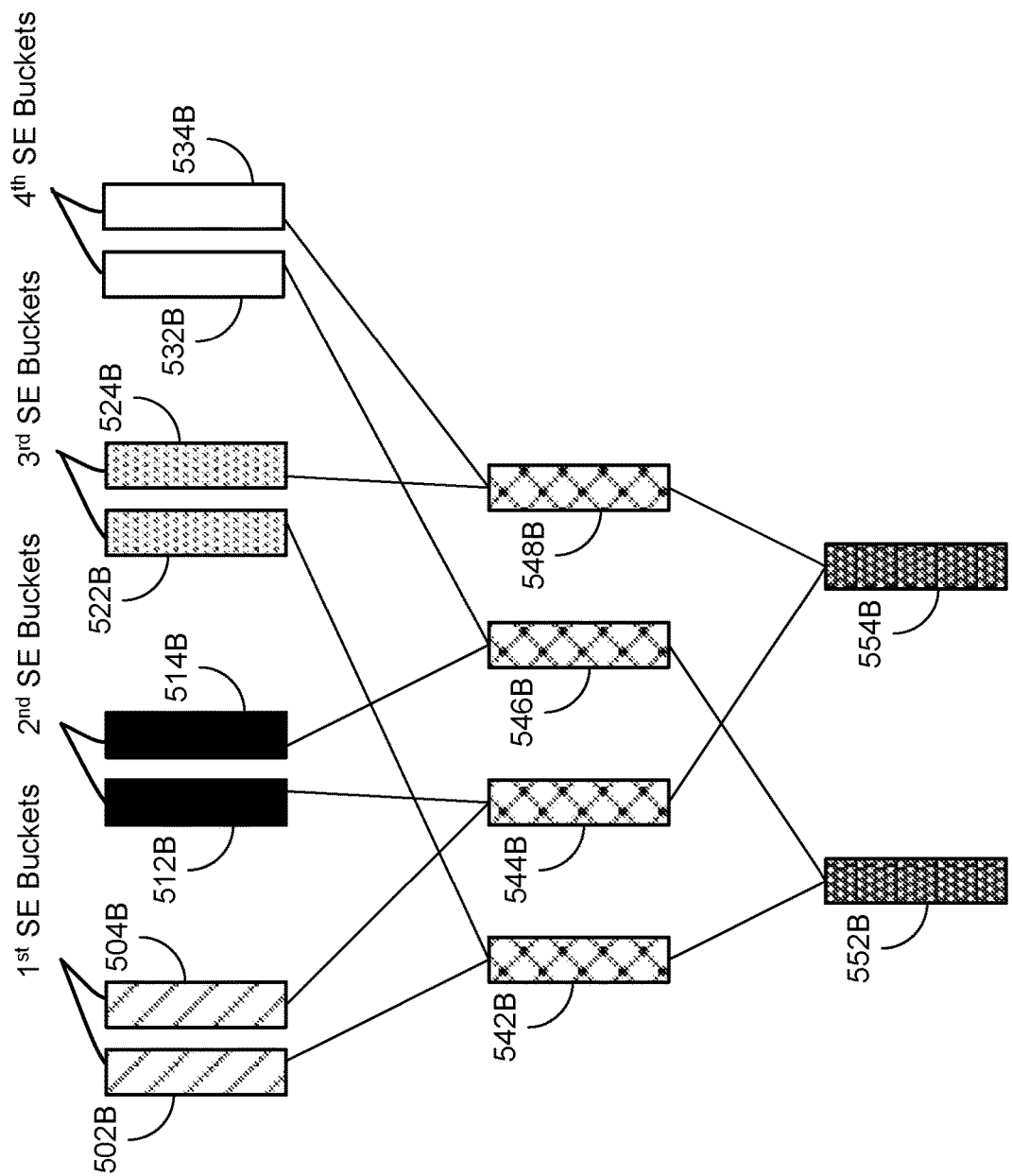
FIG. 6 is a block diagram depicting the merging of buckets in an exemplary embodiment of a distributed network.

FIG. 6 depicts an exemplary embodiment of a situation in which the service engines have latencies in ranges that overlap and which have a similar number of transactions. In this case, the Pt SE has buckets 502B and 504B; the $2^{nd}$ SE has buckets 512B and 514B; the $3^{rd}$ SE has buckets 522B and 524B; and the $4^{th}$ SE has buckets 532B and 534B. Because the ranges of latencies for the service engines overlap, the buckets are combined differently. Thus, buckets 402B and 522B are combined into bucket 542B, for example using a weighted sum. Buckets 504B and 512B are combined into bucket 544B. Buckets 514B and 532B are merged into bucket 546B. Buckets 524B and 534B are merged to buckets 548B. Similarly, buckets 542B and 546B are merged into system-level bucket 552B. Similarly, buckets 544B and 548B are merged into system-level bucket 554B. Although representing data for a larger fraction of the system, buckets 542B, 544B, 546B, 548B, 552B and 554B need not contain a larger amount of data. This is because the data contained in each bucket is a statistical summary of the transaction s to which they describe. In addition, in this combination, the service engines process approximately the same number of transactions. If, however, the number of transactions varied sufficiently between service engines, the buckets 502B through 534B might be combined in another manner.

Using the method 400, the system-level performance of a distributed network is determined using statistical summaries of the individual service engines. Consequently, the system-level statistical description may be rapidly obtained, without requiring raw data for the performance metrics to be stored and analyzed in bulk. Using the statistical description, other quantities of interest may be calculated. Further, real time or quasi-real time performance may be determined and adjustments to system operation may be made.

Some embodiments of the invention provide a method for collecting metric values relating to operations of a set of one or more resources executing on host computers in a data-center. In some embodiments, the set of resources includes a set of one or more applications (e.g., a cluster of webservers, application servers or database servers) for which a middlebox service is performed on the host computers, and the metric is the latency experienced by packets processed by the application set.

In some embodiments, the method hierarchically collects and analyzes samples, with a first set of samples collected and analyzed in the data plane, and a second set of samples collected and analyzed in the control plane by aggregating the samples collected in the data plane. In some embodiments, the data plane includes host computers on which sample collecting engines (e.g., service engines) execute, while the control plane includes a set of one or more servers that obtains sample data collected by the host computers, and aggregates and analyzes this data.

At a particular host computer, the method in some embodiments repeatedly identifies different sample values for a particular operational metric. During a first time period, the method identifies a first set of sample metric values and generates an individual-value (IV) first histogram that specifies the number of samples that the method has processed for each of several metric values. Based on the IV first histogram, the method specifies several bins (i.e., metric value ranges) for a sample-value range (SVR) second histogram.

During a second time period, the method identifies a second set of sample values, and generates the SVR second histogram to specify a number of samples that the method has processed for each range in a group of the specified ranges in the second histogram. The method then provides the SVR second histogram to a server to analyze in order to assess the operations of the set of resources in the datacenter. For instance, in some embodiments, the method provides the SVR second histogram to a set of one or more servers to aggregate with SVR second histograms generated by several other host computers for the particular operational metric.

Figure 7:
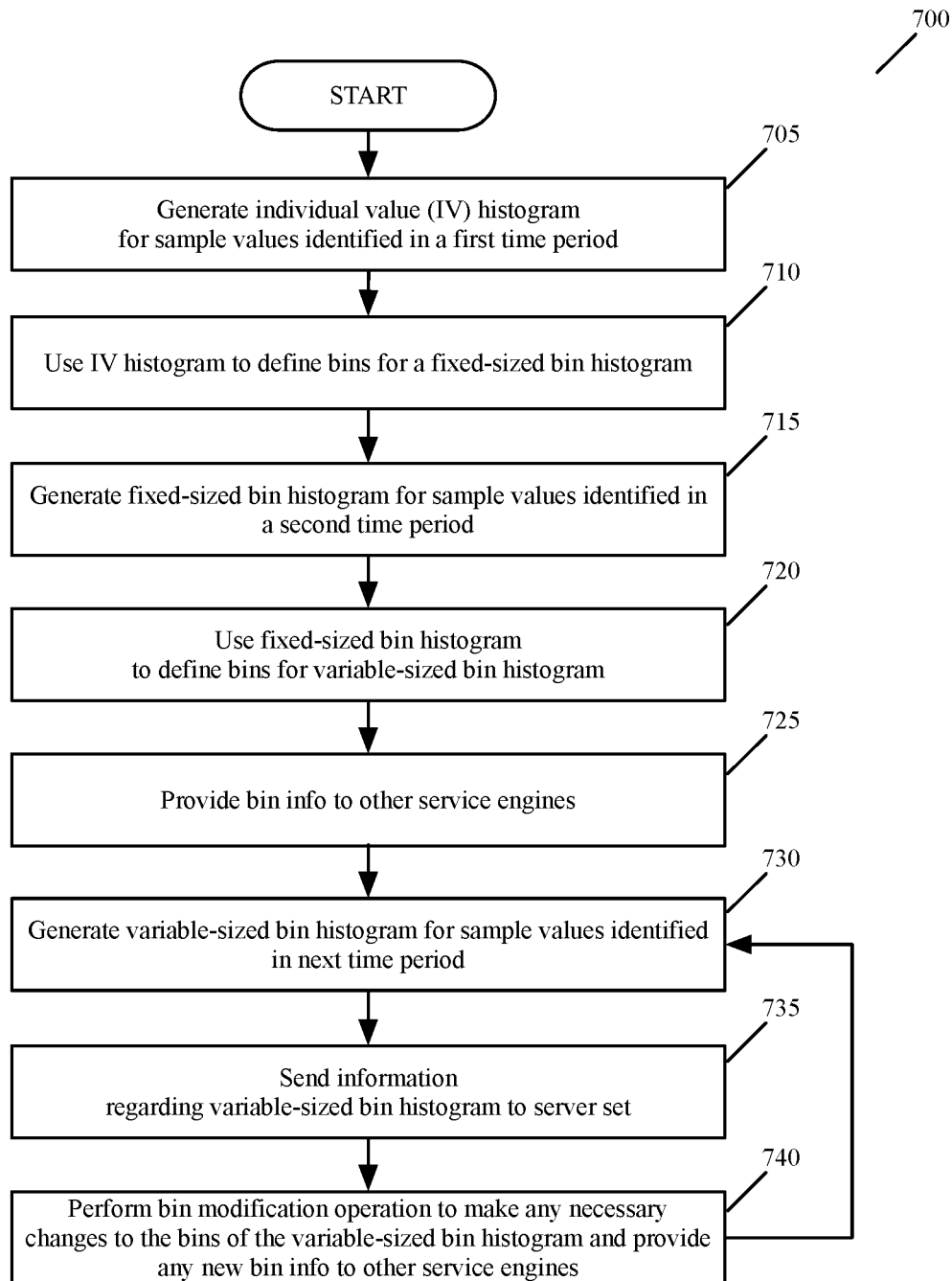
FIG. 7 illustrates a process that implements the metric-value collection method of some embodiments.

FIG. 7 illustrates a process 700 that implements the metric-value collection method of some embodiments. As further described below, this process 700 generates two SVR histograms, a first SVR histogram with fixed-sized bins that the process identifies based on an initial IV histogram, and a second SVR histogram with variable-sized bins that the process identifies based on the first SVR histogram. The process 700 iteratively reports the variable-sized bin histogram to a set of servers, then generates and reports new variable-sized bin histograms, and with each generation of this histogram, it might modify the locations and/or sizes of bins to match the metric samples collected for the previous generation of its histogram.

In some embodiments, the process 700 is performed by a service engine that executes on the particular host computer and identifies different metric values for different packets on which the service engine performs a middlebox service. This process 700 will be described by reference to the example illustrated in FIG. 8, which presents several load balancing engines 805 executing as service virtual machines (SVMs) on several host computers 810 that distribute the packet-processing load across several server applications 815 in a server application cluster 820 that execute on the host computers in a datacenter.

In this example, the packets that the load balancers distribute among the server applications 815 of the application cluster 820 are from other client applications that run in the same datacenter. Also, in this example, the client and server applications 815 operate as guest virtual machines (GVMs) that execute on the host computers 810. In other embodiments, the load balancers 805 and the applications are implemented differently, e.g., are implemented as containers, hypervisor service engines, etc. The host computers 810 communicate with each other and with a set of controllers 875 through a network 860 of the datacenter.

Figure 8:
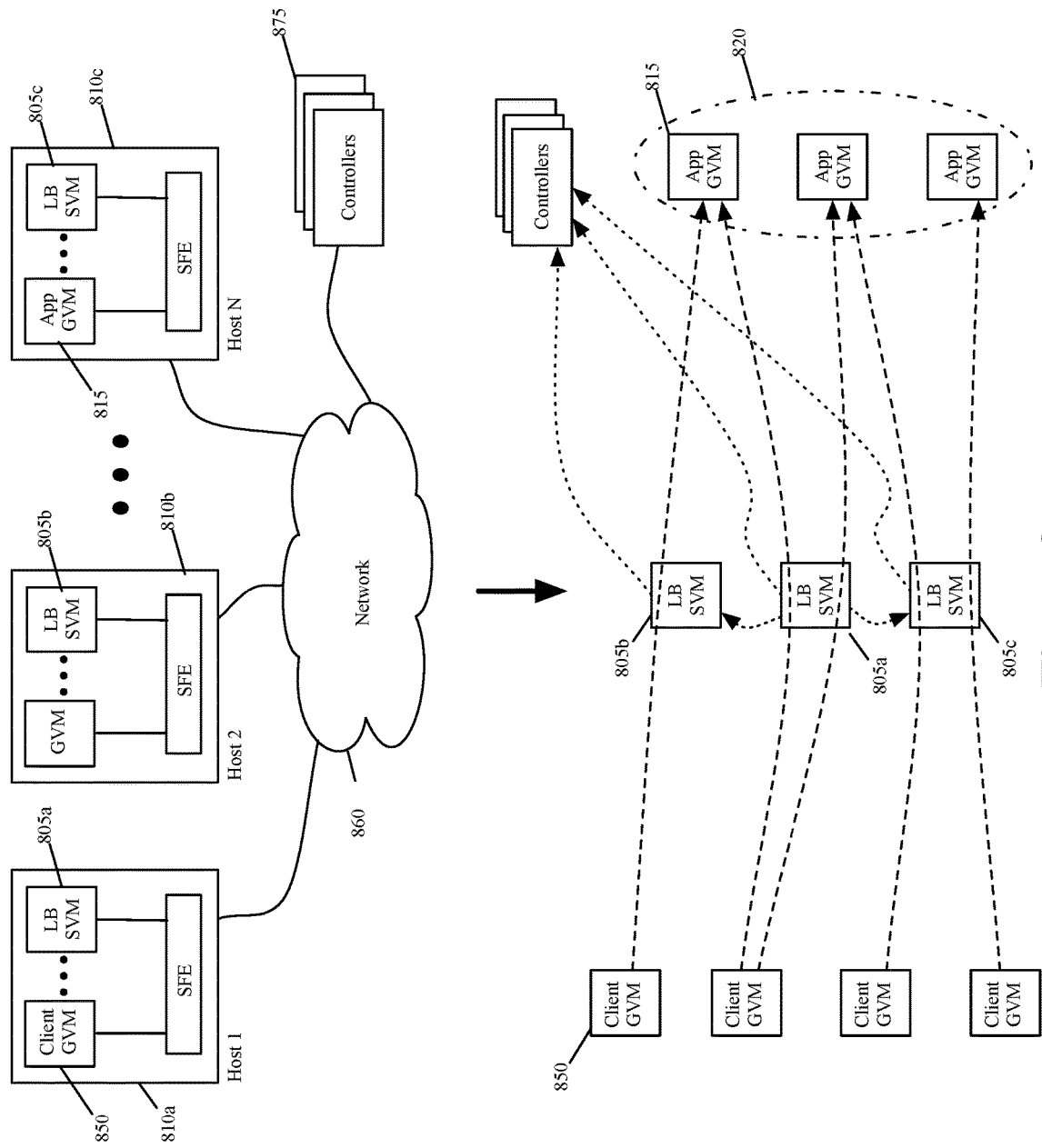
FIG. 8 presents several load balancing engines executing as service virtual machines (SVMs) on several host computers that distribute the packet-processing load across several server applications in a server application cluster that execute on the host computers in a datacenter.

In the example illustrated in FIG. 8, the load balancer 805*a* that executes on host computer 810*a* acts as the master load balancer for the application cluster 820. In this role, the load balancer 805*a* performs the process 700 for the application cluster 820, by not only generating variable-sized bin histograms to summarize the latencies experienced by packets forwarded by this load balancer 805*a* from different clients 850 to the different applications 815 of the application cluster 820, but also by defining and updating the bin structure for these variable-sized bin histograms.

In this example, the other load balancers also perform part of the process 700 to define the variable-sized bin histograms for the packets that they forward to the application cluster, but these load balancers use the bin attributes (e.g., the bin locations and sizes) provided by the load balancer 805*a* for the histograms that they generate. In some embodiments, these other load balancers executing on the other host computers 810 perform the process 700 in its entirety for other application clusters 820.

The approach of having one service engine (e.g., on load balancer) acting as a master service engine for defining the bin structure for all the service engines for a particular operational metric, is beneficial as it allows the variable-sized bin histograms that the service engines provide to a server set to aggregate to have the same bin structure (i.e., the same bins, at the same locations and with the same sizes) to simplify the aggregation of the provided histograms. Other embodiments, however, use other techniques for defining the bin structure, including having the server set define the bin structure for the variable-sized bin histograms based on samples/histograms provided the service engines or based on sample values collected by the server set in previous settings or previous sample collection cycles.

Figure 9:
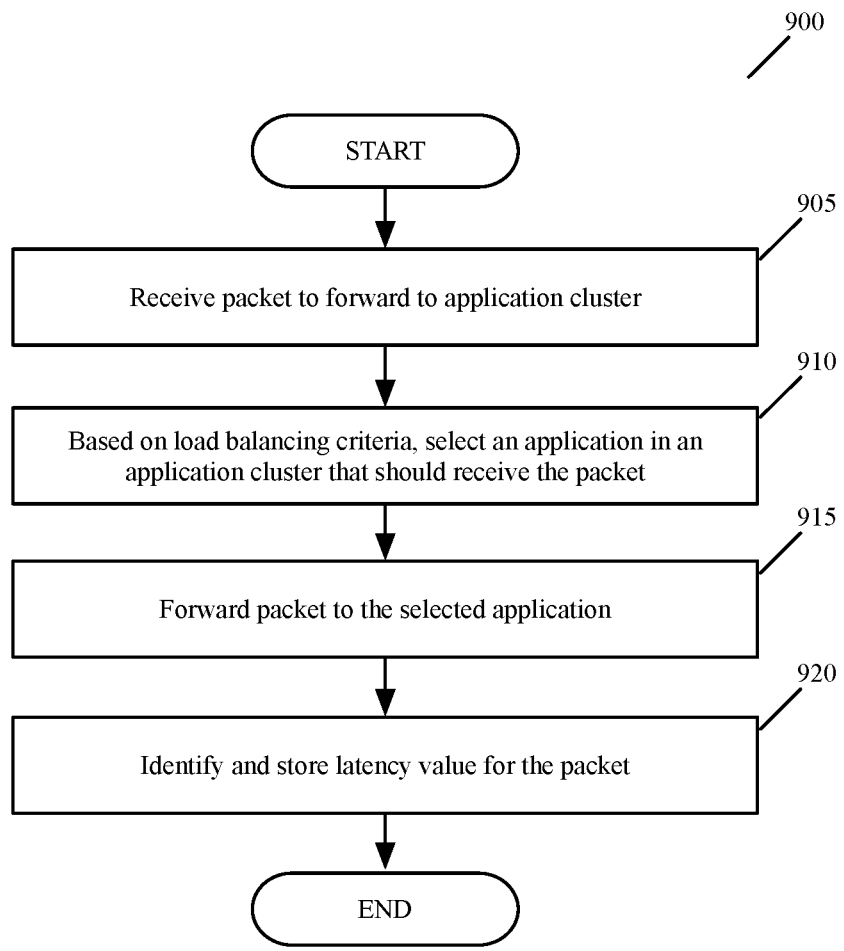
FIG. 9 illustrates a load-balancing process of some embodiments.

This process 700 will also be described by reference to an example of a load-balancing process 900 of FIG. 9. While the load balancer 805*a* performs the process 700, all of the load balancers 805 (including the load balancer 805*a*) continuously perform the process 900 to distribute different packet flows among different server applications 815 in the server application cluster 820, and to identify and record latencies experienced by the packets in these flows.

As shown, the process 900 starts when the load balancer receives (at 905) a packet to forward to the application cluster. The process 900 then identifies (at 910) an application 815 in the cluster 820 that should process the packets of the received packet's flow. When the received packet is a first packet that is received for a flow, the process 900 performs a load-balancing operation (e.g., by using weight values that direct a round robin selection operation) to select the application in the cluster 820 that should process the received packet's flow and stores the identity of the selected application for the packet's flow in a connection tracking storage.

On the other hand, when the received packet is not the first packet received for its flow, the process 900 uses the record in the connection tracking storage to identify the application selected for the packet's flow (e.g., by matching the received packet's flow identifier with the flow identifier of a record in the connection tracker that specifies an application in the cluster for the flow specified by the flow identifier).

Next, at 915, the process forwards the packet to the identified application. At 920, the process 900 identifies and stores a latency value for the packet if it needs to track such a value for the received packet. In some embodiments, the load balancers store latency values (i.e., store latency sample values) for all packets that they process, while in other embodiments the load balancers only store latency values for a subset of packet that they process as collecting such samples for all of the processed packets is too computationally and resource-consumption intensive.

Also, in some embodiments, the load balancer computes the latency value for the processed packet by interacting with the client 850 (i.e., the client application) that is the source of the processed packet to identify the round-trip time for the packet from when it leaves the client to when the client receives a responsive packet back from the application 815 that received the processed packet. In other embodiments, the load balancer computes the latency value differently, e.g., computes the time interval from when it received the packet to when it receives a responsive packet from the application 815. After 920, the process ends.

As mentioned above, the process 700 of FIG. 7 is performed by a service engine in some embodiments. The process 700 initially generates (at 705) an individual-value (IV) histogram for a first set of sample metric values (e.g., latency values) that the service engine processes during a first time period. The generated IV histogram specifies the number of samples that the service engine has processed for each of several metric values.

To generate this histogram, the process 700 maintains a list of metric values that are stored by the values, and for each metric value on the list, maintains a number that represents the number of times that that service engine has identified that metric value during the first time interval for a processed packet. The process 700 implements this list differently in different embodiments. For instance, in some embodiments, the process implements this list as a sorted linked list with each entry in the list storing a metric value and a sample count value, while in other embodiments it implements this list as a sorted array. The process 700 has a different implementation of this list in other embodiments.

Figure 10:
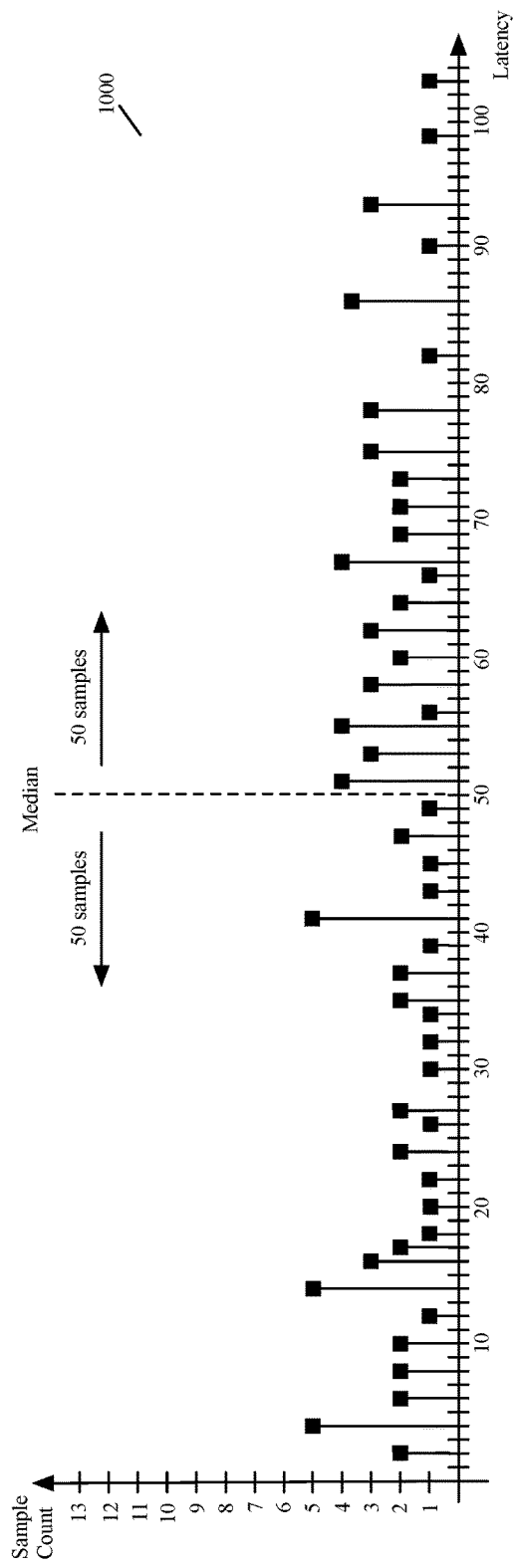
FIG. 10 illustrates an example of a generated individual value histogram for a sample of latency values that a load balancer processes in some embodiments.

FIG. 10 illustrates an example of a generated IV histogram 1000 for a sample of 100 latency values that a load balancer processes in some embodiments. In this example, the histogram is defined along an x-axis that represents individual latency values, and a y-axis that represents the number of samples. Hence, for each latency value represented in the histogram, the histogram specified the number of times that the latency value has been recorded for a packet by the load balancer. In this histogram, 50 samples have latencies below 0 to 50 milliseconds (ms), while another 50 samples have latencies between 51 to 100 ms.

In some embodiments, the process 700 allocates a first amount of a memory of its host computer for the generated IV histogram. When the process detects that the generated IV histogram has consumed a second amount of the memory that is within a threshold size of the first amount, the process 700 transitions to 710 to define the bins for a fixed-sized bin histogram for a next batch of sample values that it should analyze. In some embodiments, a sub-process of the process 700 continues to generate the IV histogram while the bin are being defined for the fixed-sized bin histogram, while in other embodiments, the process 700 stops generating the IV histogram when it starts to define the bins for the fixed-sized bin histogram.

In some embodiments, the fixed-sized bin histogram includes fixed-sized bins about the metric values identified along the IV histogram. In many cases, the IV histogram does not have sample values for the full range of possible values that the method might process. To account for this, the process 700 in some embodiments selects the fixed-sizes of the bin histogram at 710 to evenly cover the expected range of sample values.

Figure 11:
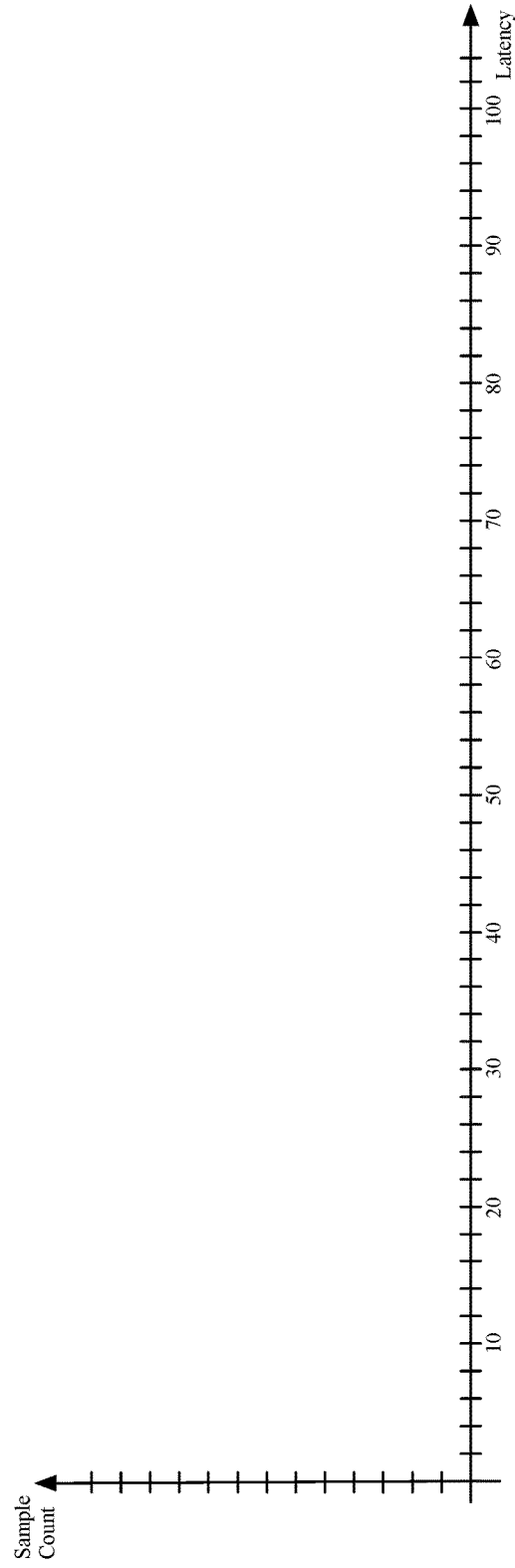
FIG. 11 illustrates an example of a fixed-sized bins generated for a fixed-bin histogram.

For the example illustrated in FIG. 10, FIG. 11 illustrates an example of the fixed-sized bins generated for the fixed-bin histogram at 710 in some embodiments. In this example, 54 bins, each with a bin size of 2, are defined about the sample values identified by the IV histogram. In this example, the last four bins are defined for latencies past 100 ms, even though the histogram 1000 did not identify any such latencies in order to have a cushion for identifying potentially larger latencies. Other embodiments, however, do not generate such extra bins, or do not use as larger a sample-value cushion.

After specifying the bin locations and sizes for the fixed-sized bin histogram, the process 700 generates (at 715) the fixed-sized bin histogram by processing another set of sample values in a second time period. This histogram specifies the number of samples that the process has analyzed for each of its fixed-sized bins. In some embodiments, the process 700 generates the fixed-sized bin histogram by stepping through the sample values, and for each sample value, identifying the histogram bin that corresponds to the sample value (i.e., the bin that specifies the value range that contains the processed sample value) and incrementing the sample count of the identified bin by one.

Figure 12:
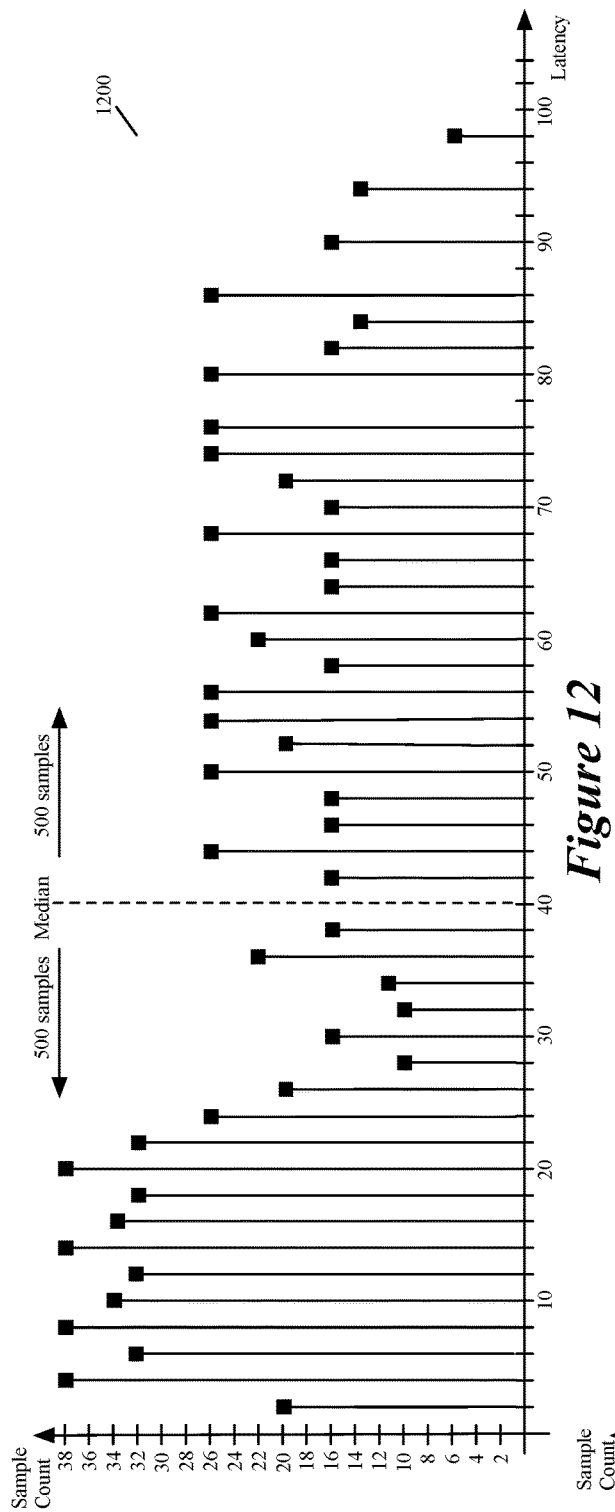
FIG. 12 illustrates an example of a fixed-sized bin histogram.

For the example illustrated in FIG. 11, FIG. 12 illustrates an example of the fixed-sized bin histogram 1200 that the process 700 generates at 715 in some embodiments. This histogram corresponds to 1000 samples analyzed by the process 700. In this histogram, sample count for the buckets corresponding to latencies of 40 ms or lower sum up to 500 while the sample count for the buckets corresponding to latencies larger than 40 ms sum up to 500. Accordingly, in this example, the median for the histogram 1200 is 40 ms.

The process 700 generates (at 715) the fixed-sized bin histogram until it determines that it should transition to a variable-sized bin histogram. The process makes this determination based on different criteria in different embodiments. For instance, in some embodiments, the process generates the fixed-sized bin histogram for only a certain number of samples, while in other embodiments, it generates this histogram for only a certain duration of time.

Once the process determines (at 715) that is should switch to a variable-sized bin histogram, the process uses (at 720) the fixed-sized bin histogram to identify the locations and sizes of the bins for variable-sized bin histogram. The process 700 performs this operation 720 differently in different embodiments. For instance, for the variable-sized bin histogram, the process 700 in some embodiments allocates one bin of x-width for the bottom 50% sample values identified by the fixed-sized bin histogram, allocates N bins of y-width for the next 40% sample values identified by the fixed-sized bin histogram, and allocates M bins of z-width for the last 10% of sample values identified by the fixed-sized bin histogram, where N and M are integers and x is greater than y, which is greater than z.

Figure 13:
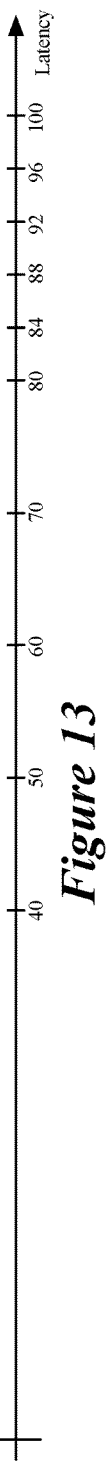
FIG. 13 illustrates an example of a variable-sized bins generated for a variable-bin histogram.

For instance, from the fixed-bin histogram example of FIG. 12, the process 700 in some embodiments generates the variable-sized bins illustrated in FIG. 13. These bins are for a variable-sized bin histogram that the process 700 should next generate. Based on the fixed-bin histogram 1200, the process 700 (1) defines ten buckets for the variable-sized bin histogram, (2) assigns the first bucket to center at 20 ms with a width of 20 ms, (3) assigns the next four buckets of the variable-sized bin histogram to center respectively at 45, 55, 65, and 75 ms, each with a width of 10 ms, and (4) assigns the last five buckets of the variable-sized bin histogram to center respectively at 82, 86, 90, 94 and 98 ms, each with a width of 4 ms. In FIG. 13, these buckets are identified by their leftmost and rightmost values in order to simplify their illustration.

This approach is optimized to identify the maximum latency values experienced by 50%, 90% and 99% of the samples, as it (1) creates the first bucket to capture the bottom 50% of expected sample value range based on what it previously processed for the fixed-value histogram, (2) creates four buckets for the next 40% of the expected sample value range, based on what it previously processed for the fixed-value histogram, and then (3) creates five buckets for the last 10% of the expected sample value range, based on what it previously processed for the fixed-value histogram.

After specifying (at 720) the bin locations and sizes for the variable-sized bin histogram, the process 700 provides (at 725) the bin locations and sizes for this histogram to the other service engines on other host computers 810 so that they can start to generate their variable-sized bin histograms based on these bins. FIG. 8 depicts the load balancer 805a providing data regarding the variable-sized bins to the other load balancers 805 executing on other host computers 810. The operation of these other load balancers to generate their variable-sized bin histograms will be described below by reference to FIG. 19.

Next, the process generates (at 730) the variable-sized histogram by processing another set of sample values in a third time period. This histogram specifies the number of samples that the process has analyzed for each of its bins. In some embodiments, the process 700 generates the variable-sized bin histogram by stepping through the sample values, and for each sample value, identifying the histogram bin that corresponds to the sample value (i.e., the bin that specifies the value range that contains the processed sample value) and incrementing the sample count of the identified bin by one.

Figure 14:
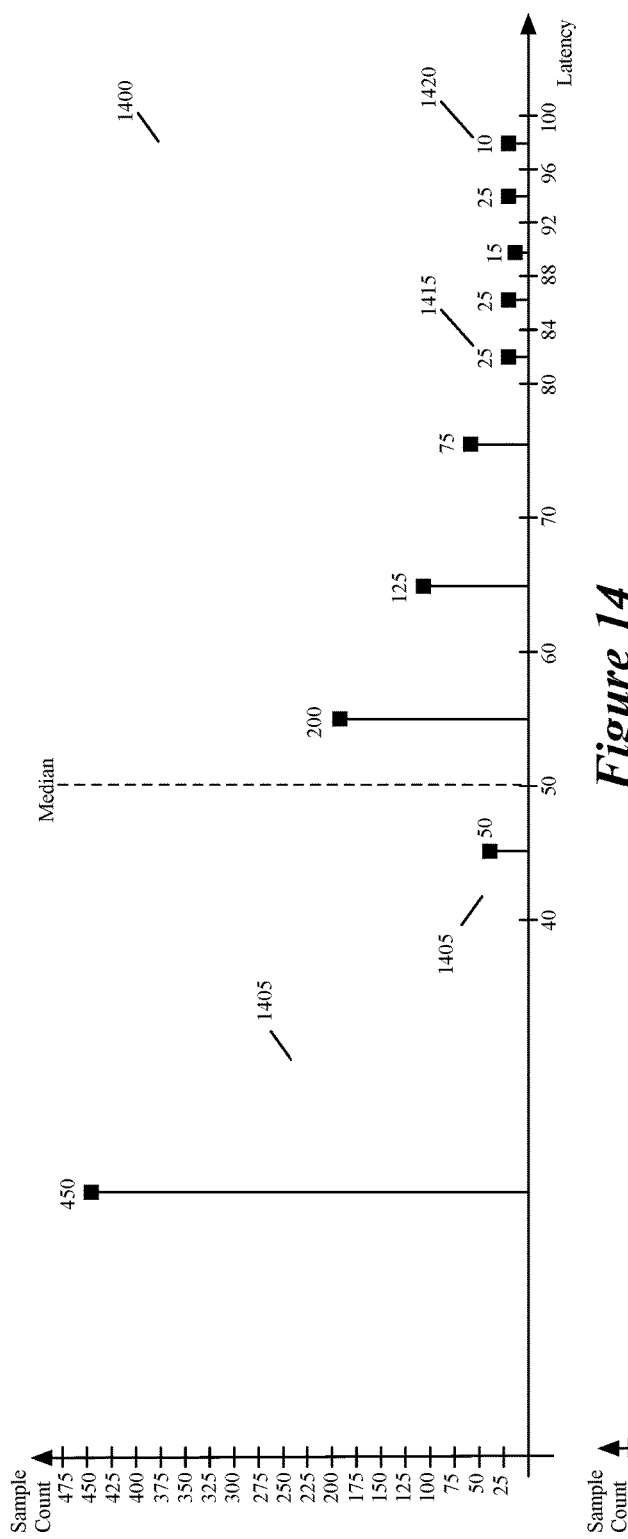
FIG. 14 illustrates an example of a variable-sized bin histogram.

For the example illustrated in FIG. 13, FIG. 14 illustrates an example of the variable-sized bin histogram 1400. that the process 700 generates at 730 in some embodiments. This histogram corresponds to 1000 samples analyzed by the process 700. As shown, 450 of the samples fall within the first bin 1405 of this histogram, 50 samples fall within the second bin 1410 of this histogram, and the remaining 500 samples fall in the other seven buckets of the histogram. Thus, the latency median has shifted from 40 ms expressed by the fixed-bin sized histogram 1200 to 50 ms, as the $500^{th}$ sample is in the second bucket 1410. Also, this histogram shows that the 90% and 99% latency values are 80 and 98 ms, as the $900^{th}$ and $990^{th}$ samples fall in the buckets 1415 and 1420 corresponding to these values.

The process 700 generates (at 730) the variable-sized bin histogram until it determines that it should report this histogram to the server set. The process makes this determination based on different criteria in different embodiments. For instance, in some embodiments, the process generates the variable-sized bin histogram for only a certain number of samples, while in other embodiments, it generates this histogram for only a certain duration of time.

Once the process determines (at 730) that is should provide the variable-sized bin histogram to the server set, the process transmits (at 735) this histogram through a network to a server to analyze in order to assess the operations of the set of resources in the datacenter. For instance, in the example illustrated in FIG. 8, the load balancer 805a provides the variable-sized histogram to a set of one or more controllers 875. As further described below, the controller set 875 aggregates this histogram with variable-sized bin histograms generated by other load balancers 805 executing on other host computers 810 for the latencies identified for packets forwarded to the application cluster 820.

Figures 15, 19:
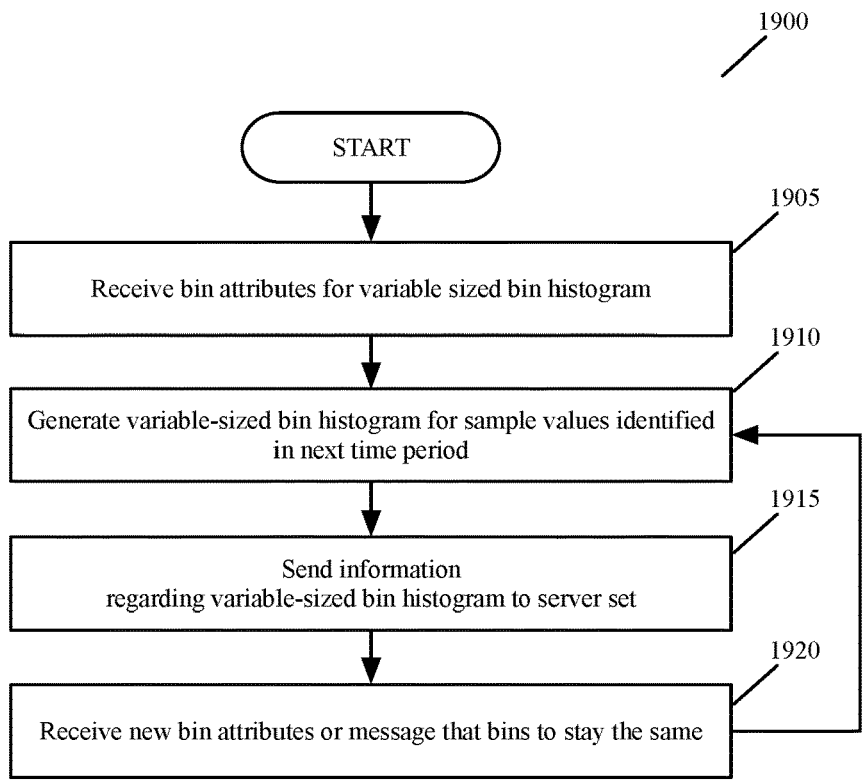
FIG. 15 illustrates an example of how the load balancers report their variable-sized bin histograms in some embodiments.
FIG. 19 illustrates a process performed by another service engine that generates a variable-sized bin histogram based on bin size/location attributes that it receives from a master service engine.

FIG. 15 illustrates an example of how the load balancers report their variable-sized bin histograms in some embodiments. As shown, a load balancer in some embodiments reports its histogram as a table with multiple records representing multiple bins. Each bin's record has a latency value that expresses the maximum latency associated with the bin, with the minimum being the maximum latency value of the previous bin, or 0 in case of the first bin. Each bin's record also has a sample count that identifies the number of processed samples that fell into the bin. In other embodiments, the load balancers report their histograms differently. Other embodiments use other schemes for specifying the bin structure. For instance, some embodiments define each bin in terms of its midpoint and its width. In some of these embodiments, the bin's width is specified in terms of a percentage of error.

After sending (at 735) the variable-sized bin histogram to the server set, the process 700 performs (at 740) a bin-modification operation to determine whether it needs to modify the locations and/or sizes of the bins of the next variable-sized bin histogram, or whether it can use the same exact bins as the previous variable-sized bin histogram that it provided to the server set. To do this, process 700 in some embodiments analyzes the sample counts expressed by the prior variable-sized bin histogram to determine whether the locations and sizes of the first bin, the last bins and the intermediate bins mirror the expressed sample counts, and if not, it modifies the locations and/or sizes of these bins.

Figure 16:
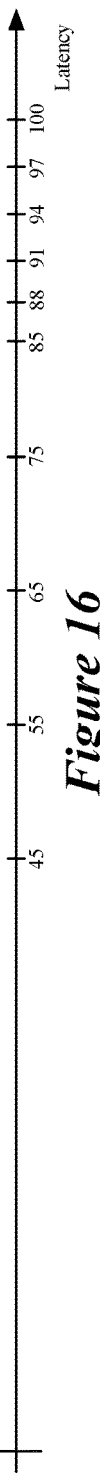
FIG. 16 illustrates an example of modifying variable-sized bins for a variable-bin histogram.

For the example illustrated in FIG. 14, the median has shifted to be 50 ms after it was initially determined to be about 40 ms with the fixed-sized bin histogram. Hence, in some embodiments, the process creates the bins illustrated in FIG. 16 for the next variable-sized bin histogram. In FIG. 16, the next variable-bin sized histogram has (1) ten buckets, (2) the first bucket centering at 22.5 ms with a width of 22.5 ms, (3) the next four buckets centering respectively at 50, 60, 70, and 80 ms, each with a width of 10 ms, and (4) the last five buckets centering respectively at 86.5, 89.5, 92.5, 95.5 and 98.5 ms, each with a width of 3 ms. Again, in FIG. 16, these buckets are identified by their leftmost and rightmost values in order to simplify the illustration.

At 740, the process 700 provides the new bin structure for the next variable-sized histogram to other service engines if it changed the bin structure, or informs the service engines that it has not changed the bin structure. After 740, the process returns to 730 to generate the next variable-sized bin histogram. The process loops through 730-740 until an external event (e.g., an instruction from a server, or the termination of its service engine's operation) causes the process 700 to shut down.

In other embodiments, the process 700 of the master service engine dynamically creates its variable-sized bin histogram differently. For instance, after generating (at 705) its IV first histogram, this process defines (at 710) an SVR second histogram from the IV first histogram, instead of generating a fixed-sized bin histogram from the IV first histogram. FIG. 17 illustrates an example of how the process 700 defines for the SVR second histogram based on the generated IV first histogram. As shown, the SVR second histogram in FIG. 17 has (1) one bin based on the bottom 25% of samples of the IV first histogram, (2) four bins for the next 25% of samples of the IV first histogram, (3) seven bins for the next 40% of samples of the IV first histogram, and (4) another nine bins for the last 10% of samples of the IV first histogram.

Based on the next set of samples that it processes, the method then processes the next 1000 samples to generate (at 715) the SVR second histogram, and uses this histogram to define (at 720) the bins for the SVR third histogram. FIG. 18 illustrates an example of the generated SVR second histogram 1800. As shown, this histogram shows the median to have moved from 50 ms to 42 ms. The approach illustrated in FIGS. 17 and 18 has the advantage of preventing the method from creating too many bins for its second histogram based on outlier sample values identified in the first histogram.

FIG. 19 illustrates a process 1900 performed by another service engine that generates a variable-sized bin histogram based on bin size/location attributes that it receives from the process 700 of FIG. 7. This other service engine generates its variable-sized bin histogram to summarize metric values that this service engine collects for the particular operational metric as it performs services on packets that it receives. Unlike the process 700, the process 1900 does not generate the bin attributes for its variable-sized bin histogram by first generating the IV histogram followed by generating a fix-sized bin histogram for the samples that it collects.

Instead, it gets the bin attributes for its variable-sized bin histogram from the process 700 as the process 700 is designated as the master process for the particular operation metric for which all of the service engines generate variable-sized bin histograms. In some embodiments, while it waits to get the bin attributes from the process 700, the service engine that performs the process 1900 continues its collection of sample metric values, so that it can generate its variable-sized bin histogram with these values and other sample values that it collects after it starts to generate this histogram.

As shown, the process 1900 initially receives (at 1905) the bin size/location attributes from the process 700 of FIG. 7. Based on these received bin attributes, the process 1900 then generates (at 1910) a variable-sized histogram by processing a set of sample values that it identifies for the particular operational metric during a time period. This histogram specifies the number of samples that the process has analyzed for each of its bins. In some embodiments, the process 1900 generates the variable-sized bin histogram by stepping through the sample values, and for each sample value, identifying the histogram bin that corresponds to the sample value (i.e., the bin that specifies the value range that contains the processed sample value) and incrementing the sample count of the identified bin by one.

The process 1900 generates (at 1910) the variable-sized bin histogram until it determines that it should report this histogram to the server set. The process makes this determination based on different criteria in different embodiments. For instance, in some embodiments, the process generates the variable-sized bin histogram for only a certain number of samples, while in other embodiments, it generates this histogram for only a certain duration of time.

Once the process determines (at 1910) that it should provide the variable-sized bin histogram to the server set, the process transmits (at 1915) this histogram through a network to a server to analyze in order to assess the operations of the set of resources in the datacenter. For instance, when the process 1900 is performed by a load balancer 805 of FIG. 8, the load balancer forwards its histogram of the latencies that it identifies to the controller set 875, which then aggregates this histogram with variable-sized bin histograms generated by other load balancers 805 executing on other host computers 810 for the latencies identified for packets forwarded to the application cluster 820.

After 1915, the process 1900 transitions to 1920, where it waits until it receives from the process 700 the bin attributes for the next variable-sized bin histogram that it should generate, or direction to use the previous bin attributes. Upon receiving (at 1920) this input from the process 700, the process 1900 transitions back to 1910 to generate its next variable-sized histogram for the next time period. The process 1900 loops through its operations until an external event (e.g., an instruction from a server, or the termination of its service engine's operation) causes the process 1900 to shut down.

Figure 20:
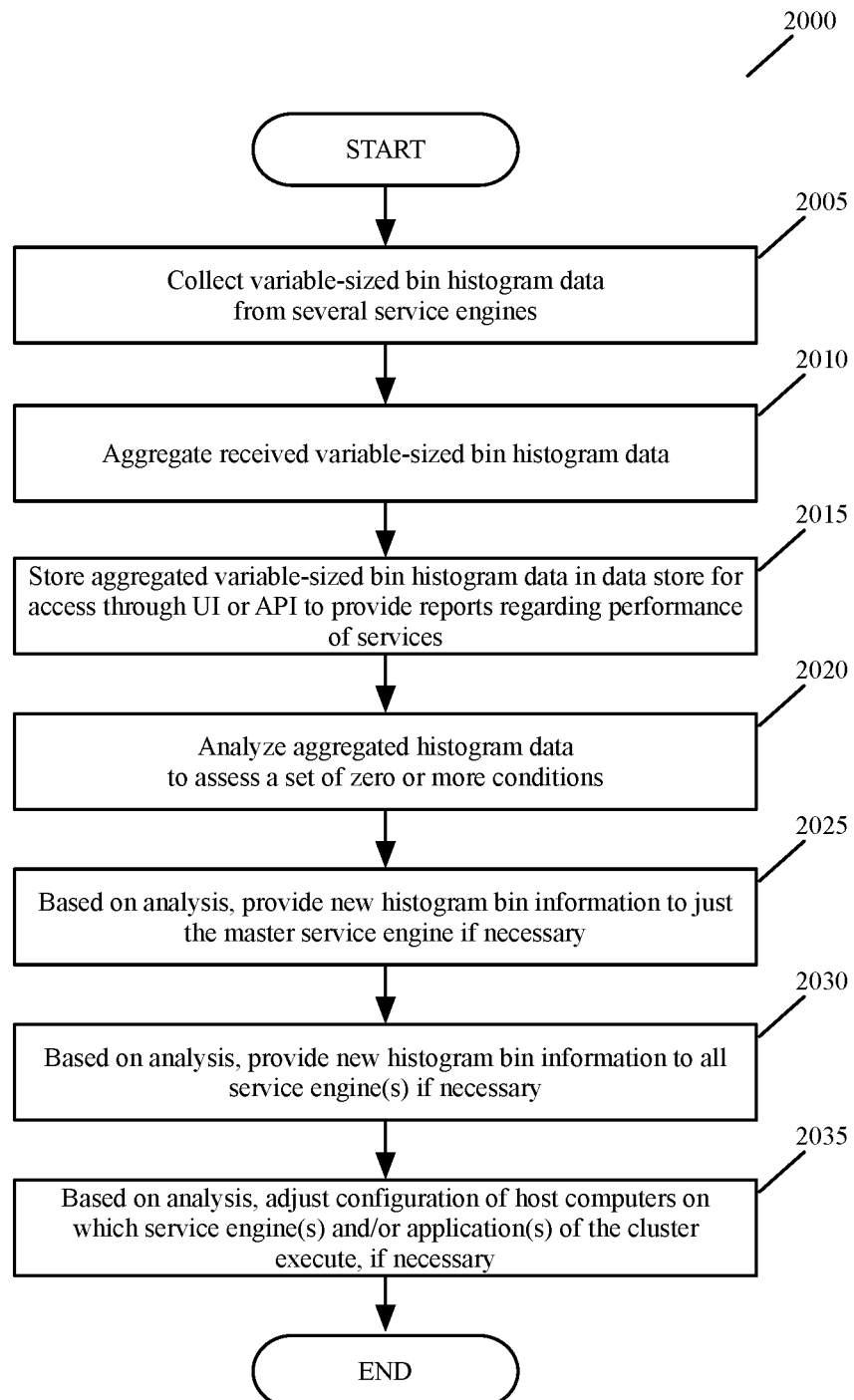
FIG. 20 illustrates a process performed by a controller in some embodiments for a set of variable-sized bin histograms reported by a set of service engines for a particular operational metric.

FIG. 20 illustrates a process 2000 performed by a controller in some embodiments for a set of variable-sized bin histograms reported by a set of service engines for a particular operational metric. One example of such an operational metric is the latency experienced by packets forwarded to a cluster of applications by a set of load balancers. In some embodiments, the controller performs the process 2000 iteratively (e.g., periodically). As shown, the process 2000 initially collects (at 2005) variable-sized bin histograms from several service engines. In some embodiments, the process 2000 directs the service engines to provide their histograms, while in other embodiments, the service engines provide their histograms to the controller at set intervals.

As mentioned above, some embodiments use one service engine as the master service engine that computes the bin attributes for the variable-sized histogram for all the service engines to use. In these embodiments, this ensures that the collected variable-sized histograms all have the same bin attributes, which simplifies the controller's aggregation of these histograms. In some embodiments, the master service engine provides its initial variable-sized histogram to the controller before the other service engines have had a chance to generate their variable-sized histograms.

In some of these embodiments, the controller uses this provided histogram as an initial set of data for generating an initial report, while in other embodiments, the controller stores this set of data for later use with other reported histogram data from the master service engine and the other service engines. In still other embodiments, the master service engine generates its initial variable-sized bin histogram for a longer duration of time than the other service engines, so that master service engines and the other service engines can report their initial histograms at the same time to the controller.

Figure 21:
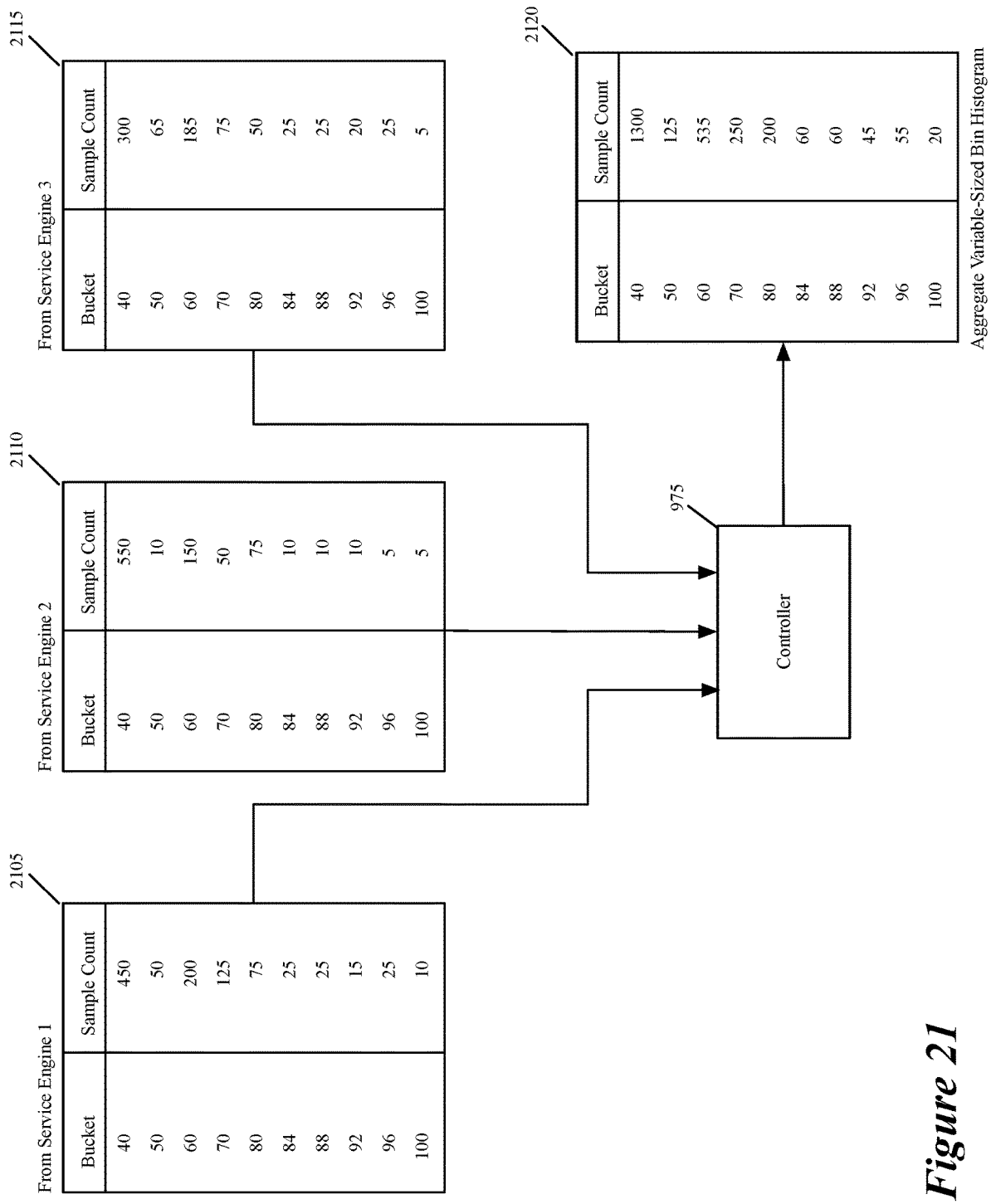
FIG. 21 illustrates a controller summing the data of three reported histograms to obtain an aggregate histogram.

After collecting (at 2005) the histograms, the process 2000 aggregates the data (at 2010) to obtain a larger histogram for the operation of all the reporting service engines in the last time period. FIG. 21 illustrates a controller 875 summing the data of three reported histograms 2105, 2110 and 2115 to obtain an aggregate histogram 2120. As shown, the controller in some embodiments simply adds the sample counts from all the corresponding bins in each histogram to produce the aggregate sample count for each bin in the aggregate histogram. This can be achieved because all of the reporting histograms have the same bin structure.

In some embodiments, the process 2000 also combines the aggregate histogram that it generates with prior aggregate histograms in its previous iterations. To do this, the process 2000 in some embodiments uses a weighted sum approach that accounts for prior aggregate histograms but at a reduced weight than the current aggregate histogram. This weighted approach also accounts for the shifting of the bins over time.

Next, at 2015, the controller stores the aggregated histogram in a data storage (e.g., in a database), which can be accessed by network administrator to obtain information regarding the collected operational metric. For instance, in some embodiments, one or more servers can access this data to provide graphical display of the aggregated histogram, or provide this information in a tabular or text form, e.g., provide latency values for 50%, 90% and 99% of the processed packets. These servers provide access to this data through their user interface, e.g., a management portal, or through their application programming interface (API) calls.

In some embodiments, the controller process 2000 also analyzes (at 2020) its aggregate histogram as well as the different histograms reported by the different service engines, in order to perform certain actions. The aggregate histogram analyzed at 2020 in some embodiments is the aggregate histogram that the process generates just for its current iteration based on the collected histograms in this iteration, while in other embodiments, the analyzed aggregate histogram is the histogram generated overall several iterations of the process 2000. Similarly, the process' analysis of the different reported histograms in some embodiments is limited to the current iteration of this process, while in other embodiments it accounts analysis of several reported histograms that each service engine reported overall several cycles of the operation of the process 2000.

For instance, after analyzing histogram data from the non-master service engines, the process 2000 in some embodiments provides (at 2025) the master service engine with some of this histogram data so that the master service engine can analyze this data to adjust its bin attributes (e.g., bin sizes and/or locations) if necessary. Alternatively, or conjunctively, after analyzing histogram data from the non-master service engines, the process 2000 in some embodiments directs (at 2030) all the service engines (including the master service engine) to use a new bin structure. In some embodiments, the process 2000 provides the new bin structure to all of the service engines when it detects that the bin structure defined by the master service engine is not suitable for the other service engines (e.g., is more than a threshold percentage off for the data collected by the other service engines). In other embodiments, the process 2000 does not perform either or both of the operations 2025 and 2030.

Some embodiments do not have one service engine serve as the master service engine for defining the bin structure for the variable-sized bin histograms generated by all of the service engines, but instead use the controllers to define this bin structure. In some of these embodiments, the controller cluster collects IV histograms or fixed-sized bin histograms from the service engines, and aggregates these histograms into an aggregate histogram. Based on this aggregate, the controller cluster generates the bin attributes for the variable-sized bin histograms, and distributes this bin structure to the service engines to use to generate their variable-sized bin histograms.

Based on the analysis of the aggregate histogram, the process 2000 in some embodiments can also provide (at 2035) new configuration data to the host computers, in order to modify the operations of the service engines and/or application cluster to improve on one or more of the operational metrics, including the particular metric for which the histograms are generated by the service engines. For instance, through the new configuration data, the controller process 2000 can deploy additional application instances (e.g., additional application VMs or containers) in the application cluster, and/or additional service engine (e.g., service VMs, etc.).

Conjunctively, or alternatively, the new configuration data might direct one or more host computers to allocate more resources (e.g., memory, processor cores, network bandwidth, etc.) to the application cluster and/or service engines. Also, in some embodiments, the new configuration data might configure other elements in the datacenter, e.g., configure front end load balancers to distribute the flows differently to the different service engines. In other embodiments, the controller process 2000 does not perform one or more of the operations 2020-2035.

While the invention has been described with reference to numerous specific details, one of ordinary skill in the art will recognize that the invention can be embodied in other specific forms without departing from the spirit of the invention. For instance, while several examples were provided above for service engines tracking latencies, one of ordinary skill will realize that some embodiments are used to track other operational metrics in a datacenter by service engines or other forwarding or compute elements in a network. Thus, one of ordinary skill in the art would understand that the invention is not to be limited by the foregoing illustrative details, but rather is to be defined by the appended claims.

The invention claimed is:

1. A method of collecting values for a particular operational metric relating to operations of a set of resources executing on a set of host computers in a datacenter, the method comprising:
   at a particular host computer,
   identifying a set of sample values for the particular operational metric relating to operations of resources executing on the particular host computer;
   based on the set of sample values for the particular operational metric, dynamically specifying different locations of bins for a histogram, each bin representing a different range of sample values for the particular operational metric;
   providing the dynamically specified bin locations to a plurality of other host computers that also collect values for the particular operational metric;
   generating the histogram to specify a number of sample values identified for each of a group of the bins of the histogram; and
   providing the histogram to a set of one or more servers to aggregate with histograms from other host computers.

2. The method of claim 1, wherein the particular host computer provides the dynamically specified bin locations to the other host computers because the particular host computer is designated as a master host computer for the particular operational metric.

3. The method of claim 2, wherein a particular service engine executing on the particular host computer performs the specifying, providing and generating, and the particular service engine is designated as a master service engine for the particular operational metric and provides the specified bin locations to other service engines executing on other host computers.

4. The method of claim 3, wherein the service engines are load balancers and the particular service engine is a load balancer that is designated as a master load balancer for an application cluster to which the particular operational metric relates.

5. The method of claim 1, wherein the particular host computer provides the specified bin locations to the other host computers so that all the host computers use a common set of bins to generate their respective histograms.

6. The method of claim 1, wherein the generated histogram is a first histogram, the method further comprising:
   at the particular host computer,
   based on the first histogram, updating the bin locations;
   providing the updated bin locations to the other host computers;
   based on the updated bin locations, generating a second histogram that specifies a number of sample values identified for each of a group of the bins of the second histogram; and
   providing the second histogram to a set of one or more servers to aggregate with histograms from other host computers.

7. The method of claim 1, wherein each histogram is a histogram with variable-sized bin.

8. The method of claim 1 further comprising receiving updated bin locations from the server set.

9. The method of claim 1, wherein the set of one or more servers analyzes the aggregated histograms and directs a subset of host computers to modify operation of one or more resources executing on each host computer in the subset of host computers.

10. A non-transitory machine readable medium storing a program for execution by at least one processing unit of a particular host computer, to collect values for a particular operational metric relating to operations of a set of resources executing on host computers in a datacenter, the program comprising sets of instructions for:
   based on a set of sample values for the particular operational metric, dynamically specifying different locations of bins for a histogram, each bin representing a different range of sample values for the particular operational metric;
   providing the dynamically specified bin locations to a plurality of other host computers that also collect values for the particular operational metric;
   generating the histogram to specify a number of sample values identified for each of a group of the bins of the histogram; and
   providing the histogram to a set of one or more servers to aggregate with histograms from other host computers.

11. The non-transitory machine readable medium of claim 10, wherein the particular host computer provides the dynamically specified bin locations to the other host computers because the particular host computer is designated as a master host computer for the particular operational metric.

12. A method of collecting values for a particular operational metric relating to operations of a set of resources executing on host computers in a datacenter, the method comprising:
   receiving histograms generated at a plurality of host computers based on sample values collected at the host computers for the particular operational metric;
   aggregating the received histograms to generate an aggregate histogram;
   storing the aggregate histogram in a data storage that has an interface for accessing data represented by the aggregated histogram in order to assess the operations of the set of resources.

13. The method of claim 12, wherein each of the received histograms is a histogram with variable-sized bins.

14. The method of claim 13, wherein all of the received histograms have a set of bins defined at a common set of locations, and aggregating the received histograms comprises adding numbers stored in each set of corresponding bins in the received histograms.

15. The method of claim 12, wherein the interface is a user interface of a management portal.

16. The method of claim 12, wherein the interface is an application programming interface (API) of the data storage.

17. The method of claim 12 further comprising analyzing the aggregate histogram and sending a communication to at least one host computer based on this analysis.

18. The method of claim 17, wherein the communication is sent to a master host computer that generates a set of locations for a set of bins of the histograms and distributes the generated set of locations to other host computers.

19. The method of claim 18, wherein the communication provides information about the aggregate histogram for the master host computer to use in assessing whether the set of bin locations should be modified and distributed to the other host computers.

20. The method of claim 18, wherein the communication provides directions to the master host computer to modify the set of bin locations.

21. The method of claim 17, wherein the communication is to all the host computers and provides directions to the host computers to modify a set of locations for a set of bins of the histograms.

22. The method of claim 17, wherein the communication comprises configuration data for adjusting resource allocation on at least one host computer to improve the operation of the set of resources as gauged by the particular operational metric.

23. The method of claim 22, wherein the server set directs the subset of host computers to modify the operation of service engine resources executing on each host computer in the subset of host computers.

24. The method of claim 22, wherein the server set directs the subset of host computers to modify the operation of application resources executing on each host computer in the subset of host computers.

* * * * *